US011653659B2

(12) United States Patent
Riis et al.

(10) Patent No.: US 11,653,659 B2
(45) Date of Patent: May 23, 2023

(54) FERMENTED MILK PRODUCT WITH A REDUCED CONTENT OF LACTOSE

(71) Applicant: CHR. HANSEN A/S, Hoersholm (DK)

(72) Inventors: Soeren Ng Riis, Roedovre (DK); Vojislav Vojinovic, Copenhagen (DK); Christian Gilleladen, Copenhagen (DK)

(73) Assignee: Chr. Hansen A/S, Hoersholm (DK)

( * ) Notice: Subject to any disclaimer, the term of this patent is extended or adjusted under 35 U.S.C. 154(b) by 0 days.

(21) Appl. No.: 16/309,892

(22) PCT Filed: Jun. 7, 2017

(86) PCT No.: PCT/EP2017/063814
§ 371 (c)(1),
(2) Date: Dec. 13, 2018

(87) PCT Pub. No.: WO2017/216000
PCT Pub. Date: Dec. 21, 2017

(65) Prior Publication Data
US 2019/0142022 A1    May 16, 2019

(30) Foreign Application Priority Data

Jun. 14, 2016   (EP) ..................................... 16174288
Oct. 17, 2016   (EP) ..................................... 16194075

(51) Int. Cl.
*A23C 9/12*       (2006.01)
*A23C 9/127*      (2006.01)
*A23C 9/154*      (2006.01)

(52) U.S. Cl.
CPC .......... *A23C 9/1206* (2013.01); *A23C 9/1275* (2013.01); *A23C 9/1542* (2013.01)

(58) Field of Classification Search
CPC .... A23C 9/1206; A23C 9/1275; A23C 9/1542
USPC ........................................................... 426/43
See application file for complete search history.

(56) References Cited

U.S. PATENT DOCUMENTS

2010/0196985 A1*  8/2010  Hotchkiss ................ C12N 9/96
                                                      435/180
2017/0215449 A1*  8/2017  Nagahata ............... A23C 9/152

FOREIGN PATENT DOCUMENTS

EP       2 957 180 A1      3/2018
WO    WO-2008000895 A1 *   1/2008  ............. A23C 9/123
WO    WO-2009/071539 A1    6/2009
WO    WO-2013/160413 A1   10/2013

OTHER PUBLICATIONS

Passerat, B. et al. Nutrition Res. 15: 1287-1295 (1995) (Year: 1995).*
SEQ IDs 2, 3, 4 Search Results. (Year: 2020).*
(Continued)

*Primary Examiner* — Hamid R Badr
(74) *Attorney, Agent, or Firm* — Foley & Lardner LLP

(57) ABSTRACT

Acidified milk product, which has a pH of between 3.0 and 5.0 and a content of lactose of at least 1.5 mg/ml, wherein the product contains a lactase, which retains its activity at a pH of 5.0 and a temperature of 37° C. at a level of at least 5% as compared to its activity at the optimum pH of the lactase.

19 Claims, 3 Drawing Sheets

Specification includes a Sequence Listing.

(56) References Cited

OTHER PUBLICATIONS

Witkowski, A. et al. Biochemistry, 38: 11643-11650 (1999) (Year: 1999).*
Seffernick, J. L. et al. J. Bacteriol. 183: 2405-2410 (2001) (Year: 2001).*
Chen et al. CN 101849577 A—English Abstract. (Year: 2010).*
Alm, L. J. Dairy Sci. 65: 346-352 (Year: 1982).*
Goulas, Theodoros et al.; "Comparative analysis of four β-galactosidases from *Bifidobacterium bifidum* NCIMB41171: purification and biochemical characterisation"; Appl Microbiol Biotechnol (2009) 82; Dec. 20, 2008; pp. 1079-1088.

\* cited by examiner

FERMENTED MILK PRODUCT WITH A REDUCED CONTENT OF LACTOSE

CROSS-REFERENCE TO RELATED APPLICATIONS

The present application is the U.S. National Stage of International Application PCT/EP2017/063814 filed Jun. 7, 2017, and claims priority to European Patent Application Nos. 16174288.7, filed Jun. 14, 2016 and 16194075.4, filed Oct. 17, 2016.

FIELD OF THE INVENTION

The present invention relates to an acidified milk product with a reduced content of lactose.

BACKGROUND OF THE INVENTION

WO 2009/071539 discloses a lactase originating from *Bifidobacterium bifidum*, which is capable of very efficient hydrolysis in milk, and which is active over a broad pH range, including low pH, e.g. a pH below 5. The lactase may be used in processes for producing milk and fermented milk products, such as cheese, yogurt, butter, butter milk, sour cream etc., for reducing the content of lactose.

WO 2013/160413 discloses a method of producing a fermented milk product using a combination of glucose-negative lactic acid bacteria strains and a conventional lactase with an object of reducing the content of lactose in the fermented milk product while increasing the content of glucose.

EP-A1-2 957 180 discloses a method of producing a fermented milk product using a combination of a starter cultures and a conventional lactase with an object of reducing content of lactose and the level of post-acidification in the fermented milk product.

SUMMARY OF THE INVENTION

The object of the present invention is to provide an improved acidified milk product with reduced lactose content.

The object of the present invention is obtained by an acidified milk product, which has a pH of between 3.0 and 5.0 and a content of lactose of at least 1.5 mg/ml, wherein the product contains a lactase, which retains its activity at a pH of 5.0 and a temperature of 37° C. at a level of at least 5% as compared to its activity at the optimum pH of the lactase.

The present invention has provided a possibility of modifying a lactose-containing food product with a pH of between 3.0 and 5.0 in a storage phase at ambient storage temperature, i.e. without the need for refrigeration, after completion of the production at a production site, e.g. during transport and storage at the retailer, so as to reduce the level of lactose. The present invention is based on the recognition that for a product of low pH and intended for transport and storage at ambient temperature, e.g. post-pasteurized fermented milk products, it is possible to carry out a reduction of the lactose content after completion of the production at a production site by means of adding a low pH-active lactase after the usual food production process has been completed and allowing the lactase to convert lactose to galactose and glucose during the subsequent life phases of the product up until its final consumption by the end consumer. Thus, the invention allows for obtaining the step of the lactose conversion in a simple and cost-effective manner outside the production site, and hence the process for producing the fermented milk product at the production site may be simplified by exclusion of the step of completing the conversion of lactose thereby saving time and production equipment capacity.

Furthermore, when the lactase is added after heat treatment of the fermented milk product, it is possible to use a lower amount of lactase than when the lactase is active during the fermentation, because the lactase may be allowed to be active for a prolonged period of time, whereas in a fermentation process in a production it is desired to conduct the process as quickly as possible in order to reduce costs. Most of the lactase will be inactivated during heat treatment and will hence not be active after heat treatment. Thus, the present invention has provided a possibility of reducing the amount of lactase needed for obtaining a removal of the lactose content of a fermented milk product. Also, when the lactase is added after heat treatment of the fermented milk product, the level of Maillard reaction caused by the heat treatment of the fermented milk product is reduced, because lactose give rise to less Maillard reaction than the carbohydrate metabolites of lactose. Finally, when the lactase is added after heat treatment of the fermented milk product, any adverse effect of the lactic acid bacteria used in the fermentation on the activity of the lactase can be avoided.

Worldwide, a significant numbers of consumers are intolerant or sensitive to lactose. Therefore, there is presently a high demand for dairy products, including fermented milk products, with a reduced content of lactose or which is substantially free of lactose. The present invention has provided a new approach for producing such product in a simple and cost-efficient manner.

DETAILED DISCLOSURE OF THE INVENTION

Lactase

The lactase of the fermented milk product of the invention may be any lactase, which retains its activity at a pH of 5.0 and a temperature of 37° C. at a level of at least 5% as compared to its activity at the optimum pH of the lactase.

In relation to the present invention the activity in LAU of the lactase is measured as specified in the "Definitions" section below.

In a preferred embodiment of the invention, the lactase retains its activity at a pH of 5.0 and a temperature of 37° C. at a level of at least 10%, preferably at least 20%, more preferably at least 30%, more preferably at least 40%, more preferably at least 50%, more preferably at least 60%, more preferably at least 70%, and most preferably at least 80%, as compared to its activity at the optimum pH of the lactase.

In a preferred embodiment of the invention, the lactase retains its activity at a pH of 4.0 and a temperature of 37° C. at a level of at least 5%, preferably at least 10%, more preferably at least 20%, more preferably at least 30%, more preferably at least 40%, more preferably at least 50%, more preferably at least 60%, more preferably at least 70%, and most preferably at least 80%, as compared to its activity at the optimum pH of the lactase.

In a preferred embodiment of the invention, the lactase retains its activity at a pH of 3.0 and a temperature of 37° C. at a level of at least 5%, preferably at least 10%, more preferably at least 20%, more preferably at least 30%, more preferably at least 40%, more preferably at least 50%, more preferably at least 60%, more preferably at least 70%, and most preferably at least 80%, as compared to its activity at the optimum pH of the lactase.

In connection with the present invention the optimum pH of the lactase is determined by measuring the lactase activity at different pH using the method indicated in the "Definitions" section below and determining the pH with optimum activity. In particular, the lactase activity at different pH is measured in M-buffer and at 37° C. Alternatively, the lactase activity indicated in the present application as a percentage of the activity at the optimum pH of the lactase is instead to be considered to be a percentage of the lactase activity at pH 6.5.

In a preferred embodiment of the invention, the lactase retains its activity at a temperature of 10° C. and a pH of 6.0 at a level of at least 10% as compared to its activity at the optimum temperature of the lactase. Preferably, the lactase retains its activity at a temperature of 10° C. and a pH of 6.0 at a level of at least 20%, more preferably at least 30%, more preferably at least 40%, more preferably at least 50%, more preferably at least 60%, more preferably at least 70%, and most preferably at least 80%, as compared to its activity at the optimum temperature of the lactase.

In connection with the present invention the optimum temperature of the lactase is determined by measuring the lactase activity at different temperatures using the method indicated in the "Definitions" section below and determining the temperature with optimum activity. Alternatively, the lactase activity indicated in the present application as a percentage of the activity at the optimum temperature of the lactase is instead to be considered to be a percentage of the lactase activity at a temperature of 37° C.

In a preferred embodiment, the lactase to be used in the product of the present invention has a lactase activity at 37° C. and pH 5 which is at least 55%, such as at least 60%, at least 65%, at least 70% or at least 75%, of its lactase activity at 37° C. and pH 6.

In another preferred embodiment, the lactase to be used in the product of the present invention has a lactase activity at 37° C. and pH 4.5 which is at least 10%, such as at least 20%, at least 30%, at least 35% or at least 40%, of its lactase activity at 37° C. and pH 6.

In another preferred embodiment, the lactase to be used in the product of the present invention has a pH optimum of the lactase activity at 37° C. which is above pH 5.5.

In another preferred embodiment, the lactase to be used in the product of the present invention has a lactase activity at a temperature of 52° C. and a pH of 6.5 which is at least 50%, such as at least 55%, at least 60%, at least 65%, at least 70%, at least 75% or at least 80%, of its lactase activity at a temperature of 38° C. and a pH of 6.5.

In a preferred embodiment of the present invention, Km (Michaelis constant) of the lactase at 5° C. is below 25 mM, such as below 20 mM, below 15 mM or below 10 mM. In another preferred embodiment, Km of the lactase at 37° C. is below 25 mM, such as below 20 mM or below 15 mM. The skilled person will know how to determine Km for the lactase activity at a specific temperature. Km may be determined by the method described in WO2009/071539.

In another preferred embodiment, the enzyme when hydrolyzing the lactose in the milk product has a ratio of lactase to transgalactosylase activity of more than 1:1, such as more than 2:1 or more than 3:1. In another preferred embodiment, the enzyme treatment is performed under conditions where the lactase activity of the enzyme is higher than the transgalactosylase activity, such as at least two times higher or at least three times higher.

The ratio of lactase to transgalactosylase activity in the milk product may, e.g., be determined by HPLC analysis. In another preferred embodiment, the enzyme treatment is performed under conditions where at least 50% (w/w %) of the hydrolyzed lactose is converted into free galactose. In another preferred embodiment, the enzyme treatment is performed under conditions where the hydrolyzed lactose is converted into equal amounts of free glucose and free galactose.

A lactase in the context of the present invention is a glycoside hydrolase having the ability to hydrolyze the disaccharide lactose into constituent galactose and glucose monomers. The group of lactases, to which the lactase of the invention belongs, comprises but is not limited to enzymes assigned to subclass EC 3.2.1.108. Enzymes assigned to other subclasses, such as, e.g., EC 3.2.1.23, may also be lactases in the context of the present invention. A lactase in the context of the invention may have other activities than the lactose hydrolyzing activity, such as for example a transgalactosylating activity. In the context of the invention, the lactose hydrolyzing activity of the lactase may be referred to as its lactase activity or its beta-galactosidase activity.

Enzymes having lactase activity to be used in a method of the present invention may be of animal, of plant or of microbial origin. Preferred lactases are obtained from microbial sources, in particular from a filamentous fungus or yeast, or from a bacterium.

The enzyme may, e.g., be derived from a strain of *Agaricus*, e.g. *A. bisporus*; *Ascovaginospora*; *Aspergillus*, e.g. *A. niger, A. awamori, A. foetidus, A. japonicus, A. oryzae*; *Candida*; *Chaetomium*; *Chaetotomastia*; *Dictyostelium*, e.g. *D. discoideum*; *Kluveromyces*, e.g. *K. fragilis, K. lactis*; *Mucor*, e.g. *M. javanicus, M. mucedo, M. subtilissimus*; *Neurospora*, e.g. *N. crassa*; *Rhizomucor*, e.g. *R. pusillus*; *Rhizopus*, e.g. *R. arrhizus, R. japonicus, R. stolonifer*; *Sderotinia*, e.g. *S. libertiana*; *Torula*; *Torulopsis*; *Trichophyton*, e.g. *T. rubrum*; *Whetzelinia*, e.g. *W. sderotiorum*; *Bacillus*, e.g. *B. coagulans, B. circulans, B. megaterium, B. novalis, B. subtilis, B. pumilus, B. stearothermophilus, B. thuringiensis*; *Bifidobacterium*, e.g. *B. longum, B. bifidum, B. animalis*; *Chryseobacterium*; *Citrobacter*, e.g. *C. freundii*; *Clostridium*, e.g. *C. perfringens*; *Diplodia*, e.g. *D. gossypina*; *Enterobacter*, e.g. *E. aerogenes, E. cloacae Edwardsiella, E. tarda*; *Erwinia*, e.g. *E. herbicola*; *Escherichia*, e.g. *E. coli*; *Klebsiella*, e.g. *K. pneumoniae*; *Miriococcum*; *Myrothesium*; *Mucor*; *Neurospora*, e.g. *N. crassa*; *Proteus*, e.g. *P. vulgaris*; *Providencia*, e.g. *P. stuartii*; *Pycnoporus*, e.g. *Pycnoporus cinnabarinus, Pycnoporus sanguineus*; *Ruminococcus*, e.g. *R. torques*; *Salmonella*, e.g. *S. typhimurium*; *Serratia*, e.g. *S. liquefasciens, S. marcescens*; *Shigella*, e.g. *S. flexneri*; *Streptomyces*, e.g. *S. antibioticus, S. castaneoglobisporus, S. violeceoruber*; *Trametes*; *Trichoderma*, e.g. *T. reesei, T. viride*; *Yersinia*, e.g. *Y. enterocolitica*.

In a preferred embodiment, the lactase originates from a bacterium, e.g. from the family Bifidobacteriaceae, such as from the genus *Bifidobacterium*, such as from a strain of *B. bifidum*, *B. animalis* or *B. longum*. In a more preferred embodiment, the lactase originates from *Bifidobacterium bifidum*.

In a preferred embodiment, an enzyme having lactase activity to be used in the product of the present invention comprises an amino acid sequence which is at least 50% identical to a sequence selected from the group consisting of amino acids 28-1931 of SEQ ID NO: 1, amino acids 28-1331 of SEQ ID NO: 2, SEQ ID NO: 3, SEQ ID NO: 4 and lactase active fragments thereof. In a more preferred embodiment, the enzyme comprises an amino acid sequence which is at least 60%, such as at least 70%, at least 80%, at least 90%, at least 95% or at least 98% identical to a sequence selected from the group consisting of amino acids 28-1931 of SEQ ID NO: 1, amino acids 28-1331 of SEQ ID NO: 2, SEQ ID NO: 3, SEQ ID NO: 4 and lactase active fragments thereof.

A preferred enzyme is a lactase having a sequence which is at least 50%, such as at least 60%, at least 70%, at least 80%, at least 90%, at least 95% or at least 98% identical to amino acids 28-1931 of SEQ ID NO: 1 or to a lactase active fragment thereof. Such lactase active fragment of SEQ ID NO: 1 may be any fragment of SEQ ID NO: 1 having lactase activity. A lactase active fragment of SEQ ID NO: 1 may be, e.g., amino acids 28-979, amino acids 28-1170, amino acids 28-1323, amino acids 28-1331, or amino acids 28-1600 of SEQ ID NO: 1.

In a preferred embodiment, an enzyme having lactase activity to be used in the product of the present invention comprises an amino acid sequence which is at least 50% identical to amino acids 28-1331 of SEQ ID NO: 2. In a more preferred embodiment, the enzyme comprises an amino acid sequence which is at least 60%, such as at least 70%, at least 80%, at least 90%, at least 95% or at least 98% identical to amino acids 28-1331 of SEQ ID NO: 2.

In another embodiment, an enzyme having lactase activity to be used in product of the present invention has an amino acid sequence which is at least 50% identical to SEQ ID NO: 3. Preferably, the enzyme has an amino acid sequence which is at least 60%, such as at least 70%, at least 80%, at least 90%, at least 95% or at least 98% identical to SEQ ID NO: 3.

In another embodiment, an enzyme having lactase activity to be used in the product of the present invention has an amino acid sequence which is at least 50% identical to SEQ ID NO: 4. Preferably, the enzyme has an amino acid sequence which is at least 60%, such as at least 70%, at least 80%, at least 90%, at least 95% or at least 98% identical to SEQ ID NO: 4.

For purposes of the present invention, the degree of identity between two amino acid sequences is determined using the Needleman-Wunsch algorithm (Needleman and Wunsch (1970) *J. Mol. Biol.* 48: 443-453) as implemented in the Needle program of the EMBOSS package (EMBOSS: The European Molecular Biology Open Software Suite, Rice et al. (2000) *Trends in Genetics* 16: 276-277), preferably version 3.0.0 or later. The optional parameters used are gap open penalty of 10, gap extension penalty of 0.5, and the EBLOSUM62 (EMBOSS version of BLOSUM62) substitution matrix. The output of Needle labelled "longest identity" (obtained using the –no brief option) is used as the percent identity and is calculated as follows:

(Identical Residues×100)/(Length of Alignment–
Total Number of Gaps in Alignment)

A particular commercial lactase suitable for use in the present invention is Lactase F "Amano" 100SD available from Amano Enzyme Europe.

Lactases to be used in a method of the present invention may be extracellular. They may have a signal sequence at their N-terminus, which is cleaved off during secretion.

Lactases to be used in a method of the present invention may be derived from any of the sources mentioned herein. The term "derived" means in this context that the enzyme may have been isolated from an organism where it is present natively, i.e. the identity of the amino acid sequence of the enzyme are identical to a native enzyme. The term "derived" also means that the enzymes may have been produced recombinantly in a host organism, the recombinantly produced enzyme having either an identity identical to a native enzyme or having a modified amino acid sequence, e.g. having one or more amino acids which are deleted, inserted and/or substituted, i.e. a recombinantly produced enzyme which is a mutant and/or a fragment of a native amino acid sequence. Within the meaning of a native enzyme are included natural variants. Furthermore, the term "derived" includes enzymes produced synthetically by, e.g., peptide synthesis. The term "derived" also encompasses enzymes which have been modified e.g. by glycosylation, phosphorylation etc., whether in vivo or in vitro. With respect to recombinantly produced enzyme the term "derived from" refers to the identity of the enzyme and not the identity of the host organism in which it is produced recombinantly.

The lactase may be obtained from a microorganism by use of any suitable technique. For instance, a lactase enzyme preparation may be obtained by fermentation of a suitable microorganism and subsequent isolation of a lactase preparation from the resulting fermented broth or microorganism by methods known in the art. The lactase may also be obtained by use of recombinant DNA techniques.

Such method normally comprises cultivation of a host cell transformed with a recombinant DNA vector comprising a DNA sequence encoding the lactase in question and the DNA sequence being operationally linked with an appropriate expression signal such that it is capable of expressing the lactase in a culture medium under conditions permitting the expression of the enzyme and recovering the enzyme from the culture. The DNA sequence may also be incorporated into the genome of the host cell. The DNA sequence may be of genomic, cDNA or synthetic origin or any combinations of these, and may be isolated or synthesized in accordance with methods known in the art.

Lactases to be used in a method of the present invention may be purified. The term "purified" as used herein covers lactase enzyme protein essentially free from insoluble components from the production organism. The term "purified" also covers lactase enzyme protein essentially free from insoluble components from the native organism from which it is obtained. Preferably, it is also separated from some of the soluble components of the organism and culture medium from which it is derived. More preferably, it is separated by one or more of the unit operations: filtration, precipitation, or chromatography.

Accordingly, the enzyme having lactase activity may be purified, viz. only minor amounts of other proteins being present. The expression "other proteins" relate in particular to other enzymes. The term "purified" as used herein also refers to removal of other components, particularly other proteins and most particularly other enzymes present in the cell of origin of the lactase. The lactase may be "substantially pure", i.e. free from other components from the organism in which it is produced, i.e., e.g., a host organism for recombinantly produced lactase. Preferably, the lactase is an at least 40% (w/w) pure enzyme protein preparation, more preferably at least 50%, 60%, 70%, 80% or even at least 90% pure.

The term enzyme having lactase activity includes whatever auxiliary compounds that may be necessary for the enzyme's catalytic activity, such as, e.g., an appropriate acceptor or cofactor, which may or may not be naturally present in the reaction system.

The enzyme may be in any form suited for the use in question, such as, e.g., in the form of a dry powder or granulate, a non-dusting granulate, a liquid, a stabilized liquid, or a protected enzyme.

Acidified Milk Product

In a particular embodiment of the invention, the acidified product of the invention has a pH of between 3.2 and 4.8, more preferably between 3.4 and 4.6 and most preferably between 3.6 and 4.4.

In one embodiment of the invention, the acidified milk product is a chemically acidified milk product. The acidification may be carried out by means of any acidifying agent approved for food products, such as lactic acid, citric acid, malic acid, tartaric acid, phosphoric acid, fumaric acid, fruit juice, fruit pulp and fruit compound.

In another embodiment of the invention, the acidified milk product is a fermented milk product produced by fermentation using a starter culture. The starter culture may be any conventional starter culture of lactic acid bacteria, including single strain culture and culture blends, used for producing a specific type of fermented milk product. Other useful bacteria, which may be added to the product in addition to the starter culture, include the probiotic bacteria *Bifidobacterium* spp.

In a preferred embodiment of the invention, the fermented milk product after fermentation has been subjected to a heat treatment so as to reduce the level of bacteria of the starter culture to no more than $1 \times 10 \exp 02$ CFU per g, and wherein the lactase has been added after heat treatment.

The starter culture may be any conventional starter culture of lactic acid bacteria, including single strain culture and culture blends, used for producing a specific type of fermented milk product. In a preferred embodiment of the product of the invention, the fermentation is carried out so as to obtain a pH of between 3.0 and 5.0, preferably between 3.2 and 4.8, more preferably between 3.4 and 4.6 and most preferably between 3.6 and 4.4.

The heat treatment so as to reduce the level of bacteria of the starter culture to no more than $1.0 \times 10 \exp 02$ CFU per g fermented milk is preferably carried out by subjecting the starter culture fermented milk product to a temperature of between 50° C. and 110° C., preferably between 50° C. and 100° C., preferably between 50° C. and 90° C., preferably between 60° C. and 85° C., more preferably between 65° C. and 82° C., and most preferably between 70° C. and 80° C. The heat treatment is preferably carried out for a period of between 5 seconds and 180 seconds, preferably between 5 seconds and 120 seconds, more preferably between 5 seconds and 90 seconds, more preferably between 5 seconds and 60 seconds, more preferably between 8 seconds and 50 seconds and most preferably between 10 and 40 seconds. Preferably, the level of bacteria of the starter culture is reduced to no more than $1.0 \times 10 \exp 01$ CFU per g fermented milk, more preferably 0 CFU per g.

The enzyme is added in a suitable amount to achieve the desired degree of lactose hydrolysis under the chosen reaction conditions. In a particular embodiment of the invention, the milk product contains lactase in an amount of between 100 and 20000 LAU per liter milk product, preferably between 100 and 10000 LAU per liter milk product, preferably between 100 and 5000 LAU per liter milk product, preferably less than 3000, such as less than 1500, less than 1000, less than 750 or less than 500, LAU per liter milk product.

In a preferred embodiment, the lactase is added at a concentration of between 5 and 400 LAU per g lactose in the milk product, preferably between 5 and 200 LAU per g lactose in the milk product, preferably between 5 and 100 LAU per g lactose in the milk product, preferably less than 50, such as less than 40, less than 30, less than 20 or less than 10, LAU per g lactose in the milk product.

In a preferred embodiment of the invention, the acidified milk product has a content of lactose of between 2.0 mg/ml and 50 mg/ml, preferably between 5 mg/ml and 48 mg/ml, more preferably between 10 mg/ml and 46 mg/ml, and most preferably between 20 mg/ml and 45 mg/ml.

In a preferred embodiment of the invention, the acidified milk product contains a further food product selected from the group consisting of fruit beverage, fermented cereal products, chemically acidified cereal products, soy milk products and any mixture thereof.

The acidified milk product typically contains protein in a level of between 2.0% by weight to 3.5% by weight. The acidified milk product may also be a low protein product with a protein level of between 1.0% by weight and 2.0% by weight. Alternatively, the acidified milk product may be a high protein product with a protein level of above 3.5% by weight. In a particular embodiment of the acidified milk product of the invention the product is a mixture of an acidified milk product and a cereal product, e.g. an oat product, wherein the cereal product may be a fermented cereal product, e.g. a fermented oat product.

In a particular embodiment of the invention, the acidified milk product contains a fermented cereal product. The fermented cereal product may be prepared by milling the grains of a cereal biological source material to produce a cereal flour, which is then subjected to fermentation. The fermentation of the cereal flour may be carried out using the same lactic acid bacteria (starter culture) as used for fermentation of a milk substrate as described elsewhere in this application.

In a particular embodiment of the invention, the acidified milk product contains a fruit beverage. The fruit beverages may further contain e.g. oat, soy, almond, whey and/or non-fermented milk, e.g. in the form of milk powder.

In a particular embodiment of the invention the acidified milk product of the invention is a chemically acidified product. The acidification may be carried out using any acidifying agent suitable for adding to food products, such as lactic acid, citric acid, fruit juice, fruit pulp and fruit compound. In a particular embodiment, the acidified milk product is acidified with fruit juice.

In a particular embodiment of the invention, the acidified milk product contains a chemically acidified cereal product. The chemically acidified cereal product may be prepared by milling the grains of a cereal biological source material to produce a cereal flour, which is then used to produce an aqueous suspension, and the pH of the said suspension is then adjusted to a desired level.

Acidified Milk Product Containing Acid Whey or Acid Whey Permeate

In a particular aspect of the invention, the acidified milk product contains an acid whey product selected from the group consisting of acid whey and acid whey permeate. In particular, the acid whey product is obtained from concentration of a fermented milk product to divide it into a concentrated fraction and a separated acid whey fraction.

Acid whey and acid whey permeate are by-products from the production of a number of fresh cheeses, such as cottage cheese, ricotta, Skyr, Greek Yogurt, Tvoroq, quark and Labneh. Acid whey and acid whey permeate have a pH of less than 5.1 in a 10% solution, and historically it has been difficult to find a use for the by-products, e.g. due to its acidity. Acid whey is obtained by concentration of yogurt in a separator. Acid permeate is obtained by concentration of yogurt in ultrafiltration.

This present aspect of the invention has provided a possibility of using acid whey and acid whey permeate to produce a milk product, e.g. a milk beverage. The aspect is based on the recognition that acid whey and acid whey permeate are suitable for producing the milk product of the invention with a reduced content of lactose, since the production of the product requires enzymatic hydrolysis of lactose at a low pH.

In a particular embodiment of the third aspect of the process of the invention, the starter culture fermented milk product is subjected to a concentration step to divide the starter culture fermented milk product into a concentrated fraction and a separated acid whey fraction, wherein the separated acid whey fraction and not the concentrated fraction is subjected to the subsequent steps of the process.

Process of Producing a Fermented Milk Product

In a first aspect the present invention further relates to a process for producing an acidified milk product comprising the steps of providing a basic acidified milk product, which has a pH of between 3.0 and 5.0 and a content of lactose of at least 1.5 mg/ml, adding to the basic acidified milk product a lactase, which retains its activity at a pH of 5.0 and a temperature of 37° C. at a level of at least 5% as compared to its activity at the optimum pH of the lactase to obtain a lactase-containing acidified milk product, and storing the lactase-containing acidified milk product at a temperature of at least 2° C. for at least 1 day.

In a second aspect the present invention relates to a process for producing an acidified milk product comprising the steps of providing a basic acidified milk product, which has a pH of between 3.0 and 5.0 and a content of lactose of at least 1.5 mg/ml, subjecting the basic acidified milk product to a heat treatment so as to reduce the level of bacteria to no more than 1×10 exp02 CFU per g to obtain a heat treated acidified milk product, adding to the heat treated acidified milk product a lactase, which retains its activity at a pH of 5.0 and a temperature of 37° C. at a level of at least 5% as compared to its activity at the optimum pH of the lactase to obtain a lactase-containing acidified milk product, and storing the lactase-containing acidified milk product at a temperature of at least 2° C. for at least 1 day.

In an alternative wording the second aspect is a particular embodiment of the first aspect comprising the steps of subjecting the basic acidified milk product to a heat treatment so as to reduce the level of bacteria to no more than 1×10 exp02 CFU per g to obtain a heat treated acidified milk product, adding to the heat treated acidified milk product a lactase, which retains its activity at a pH of 5.0 and a temperature of 37° C. at a level of at least 5% as compared to its activity at the optimum pH of the lactase to obtain a lactase-containing acidified milk product, and storing the lactase-containing acidified milk product at a temperature of at least 2° C. for at least 1 day.

In a third aspect the present invention relates to a process for producing a fermented milk product comprising the steps of fermentation of a milk substrate using a starter culture of lactic acid bacteria to obtain a starter culture fermented milk product, which has a pH of between 3.0 and 5.0 and a content of lactose of at least 1.5 mg/ml, subjecting the starter culture fermented milk product to a heat treatment so as to reduce the level of bacteria to no more than 1×10 exp02 CFU per g to obtain a heat treated fermented milk product, adding to the heat treated fermented milk product a lactase, which retains its activity at a pH of 5.0 and a temperature of 37° C. at a level of at least 5% as compared to its activity at the optimum pH of the lactase to obtain a lactase-containing fermented milk product, and storing the lactase-containing fermented milk product at a temperature of at least 2° C. for at least 1 day.

In an alternative wording the third aspect is a particular embodiment of the first aspect, wherein the acidified milk product produced is a fermented milk product, and wherein the process comprises the steps of fermentation of a milk substrate using a starter culture of lactic acid bacteria to obtain a starter culture fermented milk product, which has a pH of between 3.0 and 5.0 and a content of lactose of at least 1.5 mg/ml, subjecting the starter culture fermented milk product to a heat treatment so as to reduce the level of bacteria to no more than 1×10 exp02 CFU per g to obtain a heat treated fermented milk product, adding to the heat treated fermented milk product a lactase, which retains its activity at a pH of 5.0 and a temperature of 37° C. at a level of at least 5% as compared to its activity at the optimum pH of the lactase to obtain a lactase-containing fermented milk product, and storing the lactase-containing fermented milk product at a temperature of at least 2° C. for at least 1 day.

In one embodiment of the process of the invention, the acidified milk product is a chemically acidified milk product. In another embodiment of the invention, the acidified milk product is a fermented milk product produced by fermentation using a starter culture.

In one embodiment of the process of the invention, the basic acidified milk product or the a starter culture fermented milk product may be subjected to a heat treatment so as to reduce the level of bacteria to no more than 1×10 exp02 CFU per g. Such a heat treated acidified product is also referred to as a post-pasteurized product, by which it is indicated that the product has been subjected to pasteurization after production of the chemically acidified milk product or fermented milk product. Such a heat treated acidified product need not be kept at refrigerated temperature, and hence it is suitable for transport and storage at ambient temperature.

Thus, in a preferred embodiment of the process of the invention, the lactase-containing acidified or fermented milk product is stored at a temperature of at least 5° C., preferably at least 10° C., more preferably at least 15° C., and most preferably at least 20° C.

In a particular embodiment of the process of the invention, the lactase-containing acidified or fermented milk product is stored for at least two days, preferably at least 3 days, more preferably at least 4 days, more preferably at least 5 days, more preferably at least 6 days, and most preferably at least 7 days.

In a particular embodiment of the invention, the lactase-containing acidified or fermented milk product after storage has a content of lactose of less than 40 mg/ml, preferably less than 35 mg/ml, more preferably less than 30 mg/ml, more preferably less than 25 mg/ml, more preferably less than 20 mg/ml, more preferably less than 15 mg/ml, more preferably less than 10 mg/ml, more preferably less than 5 mg/ml, more preferably less than 3 mg/ml, and most preferably less than 1.5 mg/ml.

The starter culture may be any conventional starter culture of lactic acid bacteria, including single strain culture and culture blends, used for producing a specific type of fermented milk product. In a preferred embodiment of the product of the invention, the fermentation is carried out so as to obtain a pH of between 3.0 and 5.0, preferably between 3.2 and 4.8, more preferably between 3.4 and 4.6 and most preferably between 3.8 and 4.4.

The heat treatment so as to reduce the level of bacteria of the starter culture to no more than 1.0×10 exp02 CFU per g fermented milk is preferably carried out by subjecting the starter culture fermented milk product to a temperature of between 50° C. and 110° C., preferably between 50° C. and 100° C., preferably between 50° C. and 90° C., preferably between 60° C. and 85° C., more preferably between 65° C. and 82° C., and most preferably between 70° C. and 80° C. The heat treatment is preferably carried out for a period of between 5 seconds and 180 seconds, preferably between 10 seconds and 180 seconds, preferably between 12 seconds and 120 seconds, more preferably between 14 seconds and 90 seconds, more preferably between 16 seconds and 60 seconds, more preferably between 18 seconds and 50 seconds and most preferably between 20 and 40 seconds. Preferably, the level of bacteria of the starter culture is reduced to no more than 1.0×10 exp01 CFU per g fermented milk, more preferably 0 CFU per g. Fermented milk products subjected to a heat treatment so as to reduce the level of bacteria to no more than 1×10 exp02 CFU per g are suitable for use storage at ambient temperature, such as storage at a temperature of at least 5° C., preferably at least 10° C., more preferably at least 15° C., and most preferably at least 20° C.

In a fourth aspect the present invention relates to a process for producing a fermented milk product comprising the steps of fermentation of a milk substrate using a starter culture of lactic acid bacteria to obtain a starter culture fermented milk product, which has a pH of between 3.0 and 5.0 and a content of lactose of at least 1.5 mg/ml, subjecting the starter culture fermented milk product to a heat treatment so as to reduce the level of bacteria to no more than 1×10 exp08 CFU per g to obtain a heat treated fermented milk product, adding to the heat treated fermented milk product a lactase, which retains its activity at a pH of 5.0 and a temperature of 37° C. at a level of at least 5% as compared to its activity at the optimum pH of the lactase to obtain a lactase-containing fermented milk product, and storing the lactase-containing fermented milk product at a temperature of at least 2° C. for at least 1 day. Preferably, the level of bacteria of the starter culture is reduced to no more than 1.0×10 exp07 CFU per g fermented milk, more preferably no more than 1.0×10 exp06 CFU per g fermented milk, and most preferably no more than 1.0×10 exp05 CFU per g fermented milk. Fermented milk products subjected to a heat treatment so as to reduce the level of bacteria to no more than e.g. 1×10 exp08 CFU per g have an extended shelf life at refrigerated temperature.

The enzyme is added in a suitable amount to achieve the desired degree of lactose hydrolysis under the chosen reaction conditions. In a particular embodiment of the invention, the milk product contains lactase in an amount of between 100 and 20000 LAU per liter milk product, preferably between 100 and 10000 LAU per liter milk product, preferably between 100 and 5000 LAU per liter milk product, preferably less than 3000, such as less than 1500, less than 1000, less than 750 or less than 500, LAU per liter milk product.

In a preferred embodiment, the lactase is added at a concentration of between 5 and 400 LAU per g lactose in the milk product, preferably between 5 and 200 LAU per g lactose in the milk product, preferably between 5 and 100 LAU per g lactose in the milk product, preferably less than 50, such as less than 40, less than 30, less than 20 or less than 10, LAU per g lactose in the milk product.

In a preferred embodiment of the invention, the acidified milk product has a content of lactose of between 2.0 mg/ml and 45 mg/ml, preferably between 5 mg/ml and 40 mg/ml, more preferably between 10 mg/ml and 37 mg/ml, and most preferably between 20 mg/ml and 37 mg/ml.

In a preferred embodiment of the invention, the acidified milk product, to which lactase is to be added, has a viscosity, which allows easy distribution of the lactase in acidified milk product, e.g. by mixing. In a preferred embodiment of the process of the invention the lactase to be added to the fermented milk product is provided in a sterile formulation. In another preferred embodiment of the process of the invention the lactase is added to the fermented milk product under aseptic conditions, e.g. by sterile filtration of a solution of the lactase.

In a preferred embodiment of the process of the invention, the lactase is added to the acidified milk product by in-line dosing. In connection with the present invention, the term "in-line dosing" means dosing directly into a pipe through which the acidified milk product flows. Here, the term "pipe" means pipe or any synonym thereof, incl. channel, conduit, duct, leader, line, penstock, through and tube. Examples of commercial in-line dosing systems suitable for use in the present invention are Tetra FlexDos® Aseptic in-line dosing and Tetra Aldose® Aseptic in-line dosing.

In a preferred embodiment of the process of the invention, the lactase is added to the acidified milk product by in-line dosing into a pipe, and subsequently the lactase is mixed into the yogurt in the pipe by a mixing device. Preferably, the mixing device is selected from the group consisting of at least one bend of the pipe, a back pressure spring, a static mixer or a rotor/static mixer. A commercial example of a rotor/static mixer is Ytron-Z homogenizer (shear pump).

Two-Step Addition of Lactase

In a particular embodiment of the third and fourth aspect of the process of the invention, a lactase is added upstream of the heat treatment of the starter culture fermented milk product. The upstream-added lactase may be any lactase, including a lactase selected from the group consisting of a Ha-lactase and the lactase used in the process of the invention, i.e. a lactase, which retains its activity at a pH of 5.0 and a temperature of 37° C. at a level of at least 5% as compared to its activity at the optimum pH of the lactase. A Ha-lactase is a lactase obtained from yeast from the genus *Klyveromyces*, in particular selected from the group consisting of *Klyveromyces lactis* and *Klyveromyces fragilis*.

In a particular embodiment the upstream-added lactase is added at the start of the fermentation together with the starter culture. In this case the upstream-added lactase is preferably a Ha-lactase.

In another particular embodiment the upstream-added lactase is added after the start of the fermentation.

When adding lactase both at the start of the fermentation and after heat treatment of the starter culture fermented milk product, part of the lactose will be hydrolyzed during the fermentation step and the remaining part of the lactose will be hydrolyzed during storage of the heat-treated fermented milk product. When adding lactase both at the start of the fermentation and after heat treatment of the starter culture fermented milk product, it is possible to reduce to total amount of lactase added in order to reduce the concentration of lactose in the fermented milk product to a desired level as compared to adding lactase only after heat treatment of the starter culture fermented milk product. Thus, the lactase added at the start of the fermentation will be active at a higher pH than a pH of between 3.0 and 5.0, e.g. at a pH of between 5.0 and 7.0, and most lactases have a higher activity at such a higher pH. Therefore, a given amount of lactase added at the start of the fermentation will result in a higher hydrolysis of lactose than the same amount of lactase added after heat treatment of the starter culture fermented milk product.

Use

The present invention further relates to use of a lactase, which retains its activity at a pH of 5.0 and a temperature of 37° C. at a level of at least 5% as compared to its activity at the optimum pH of the lactase, for adding to an acidified milk product, which has a pH of between 3.0 and 5.0 and a content of lactose of at least 1.5 mg/ml, in order to reduce the said lactose during storage.

Definitions

In connection with the present invention the following definitions apply:

"LAU" means "Lactose Units" and 1 lactase unit (1 LAU) is the amount of enzyme which releases 1 micromole glucose per minute in M-buffer at pH 6.5 and 37° C. with a lactose concentration of 4.75% w/v. M-buffer is prepared by dissolving 3.98 g $C_6H_5Na_3O_7$-$2H_2O$, 8.31 g citric acid, 0.9 g $K_2SO_4$, 2.6 g $K_2HPO_4$, 7.35 g $KH_2PO_4$, 5.45 g KOH, 4.15 g $MgCl_2$-$6H_2O$, 3.75 g $CaCl_2$-$2H_2O$ and 1.4 g $NaHCO_3$ in 4 liter water, adding 12.5 ml 4N NaOH, adjusting to pH 6.5 using HCl, and adding water up to a total volume of 5 liter.

The activity in LAU of a specific lactase may be determined by direct measurement of glucose released from lactose under the conditions described above. The skilled person will know how to determine such activity. Alternatively, the activity may be determined by using the lactase activity assay described in Example 1 of the present application. Here, the activity is obtained by comparing to a standard curve run with a lactase of known activity, and the activity of the unknown sample calculated from this. The lactase of known activity may, e.g., be Lactozym obtained from Novozymes A/S, Denmark.

The expression "heat treatment" means any treatment using any temperature, for any period of time and by any means or equipment, which inactivates at least a portion of the bacteria of the starter culture. In this connection the term "inactivate" means any stop, reduction or inhibition of growth of the bacteria, e.g. cell lysing.

The expression "lactic acid bacteria" designates a gram-positive, microaerophilic or anaerobic bacteria, which ferment sugars with the production of acids including lactic acid as the predominantly produced acid, acetic acid and propionic acid. The industrially most useful lactic acid bacteria are found within the order "Lactobacillales" which includes *Lactococcus* spp., *Streptococcus* spp., *Lactobacillus* spp., *Leuconostoc* spp., *Pseudoleuconostoc* spp., *Pediococcus* spp., *Brevibacterium* spp., *Enterococcus* spp. and *Propionibacterium* spp. These are frequently used as food cultures alone or in combination with other lactic acid bacteria.

Lactic acid bacteria, including bacteria of the species *Lactobacillus* sp. and *Lactococcus* sp., are normally supplied to the dairy industry either as frozen or freeze-dried cultures for bulk starter propagation or as so-called "Direct Vat Set" (DVS) cultures, intended for direct inoculation into a fermentation vessel or vat for the production of a dairy product, such as a fermented milk product or a cheese. Such lactic acid bacterial cultures are in general referred to as "starter cultures" or "starters". Typically, a starter culture for yogurt comprises *Streptococcus thermophilus* and *Lactobacillus delbrueckii* subsp. *bulgaricus*, and in most countries a yogurt is by legislation defined as a fermented milk product produced using a starter culture comprising the two said strains.

The term "milk" is to be understood as the lacteal secretion obtained by milking of any mammal, such as cows, sheep, goats, buffaloes or camels. In a preferred embodiment, the milk is cow's milk. The term milk also includes protein/fat solutions made of plant materials, e.g. soy milk.

The term "milk substrate" may be any raw and/or processed milk material that can be subjected to fermentation according to the method of the invention. Thus, useful milk substrates include, but are not limited to, solutions/-suspensions of any milk or milk like products comprising protein, such as whole or low fat milk, skim milk, buttermilk, reconstituted milk powder, condensed milk, dried milk, whey, acid whey, whey permeate, including acid whey permeate, whey powder, including acid whey powder, sweet whey powder, demineralized whey powder and delactosed whey powder, lactose, mother liquid from crystallization of lactose, whey protein concentrate, or cream. Obviously, the milk substrate may originate from any mammal, e.g. being substantially pure mammalian milk, or reconstituted milk powder.

The term "acid whey permeate" means whey permeate obtained from concentration of a fermented milk product by ultrafiltration in production of fresh cheese, such as cottage cheese, ricotta, Skyr, Greek Yogurt, Tvoroq, quark and Labneh, manufactured by acid coagulation by lactic acid bacterium fermentation, and wherein the pH of the acid whey permeate in a 10% solution is lower than 5.1.

The term "acid whey" means whey fraction obtained from concentration of a fermented milk product in a separator in production of fresh cheese, such as cottage cheese, ricotta, Skyr, Greek Yogurt, Tvoroq, quark and Labneh, manufactured by acid coagulation by lactic acid bacterium fermentation, and wherein the pH of the acid whey fraction in a 10% solution is lower than 5.1.

Prior to fermentation, the milk substrate may be homogenized and pasteurized according to methods known in the art.

"Homogenizing" as used herein means intensive mixing to obtain a soluble suspension or emulsion. If homogenization is performed prior to fermentation, it may be performed so as to break up the milk fat into smaller sizes so that it no longer separates from the milk. This may be accomplished by forcing the milk at high pressure through small orifices.

"Pasteurizing" as used herein means treatment of the milk substrate to reduce or eliminate the presence of live organisms, such as microorganisms. Preferably, pasteurization is attained by maintaining a specified temperature for a specified period of time. The specified temperature is usually attained by heating. The temperature and duration may be selected in order to kill or inactivate certain bacteria, such as harmful bacteria. A rapid cooling step may follow.

"Fermentation" in the methods of the present invention means the conversion of carbohydrates into alcohols or acids through the action of a microorganism. Preferably, fermentation in the methods of the invention comprises conversion of lactose to lactic acid.

Fermentation processes to be used in production of dairy products are well known and the person of skill in the art will know how to select suitable process conditions, such as temperature, oxygen, amount and characteristics of microorganism(s) and process time. Obviously, fermentation conditions are selected so as to support the achievement of the present invention, i.e. to obtain a dairy product in solid (such as a cheese) or liquid form (such as a fermented milk product).

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The expression "fermented milk product" means a food or feed product wherein the preparation of the food or feed product involves fermentation of a milk substrate with a lactic acid bacteria. "Fermented milk product" as used herein includes but is not limited to products such as thermophilic fermented milk products, e.g. yoghurt, mesophilic fermented milk products, e.g. sour cream and buttermilk, as well as fermented whey.

The term "thermophile" herein refers to microorganisms that thrive best at temperatures above 35° C. The industrially most useful thermophilic bacteria include *Streptococcus* spp. and *Lactobacillus* spp. The term "thermophilic fermentation" herein refers to fermentation at a temperature above about 35° C., such as between about 35° C. to about 45° C. The term "thermophilic fermented milk product" refers to fermented milk products prepared by thermophilic fermentation of a thermophilic starter culture and include such fermented milk products as set-yoghurt, stirred-yoghurt and drinking yoghurt, e.g. Yakult.

The term "mesophile" herein refers to microorganisms that thrive best at moderate temperatures (15° C.–35° C.). The industrially most useful mesophilic bacteria include *Lactococcus* spp. and *Leuconostoc* spp. The term "mesophilic fermentation" herein refers to fermentation at a temperature between about 22° C. and about 35° C. The term "mesophilic fermented milk product" refers to fermented milk products prepared by mesophilic fermentation of a mesophilic starter culture and include such fermented milk products as buttermilk, sour milk, cultured milk, smetana, sour cream, Kefir and fresh cheese, such as quark, tvarog and cream cheese.

FIGURES

EXAMPLES

Example 1

Figure 1:
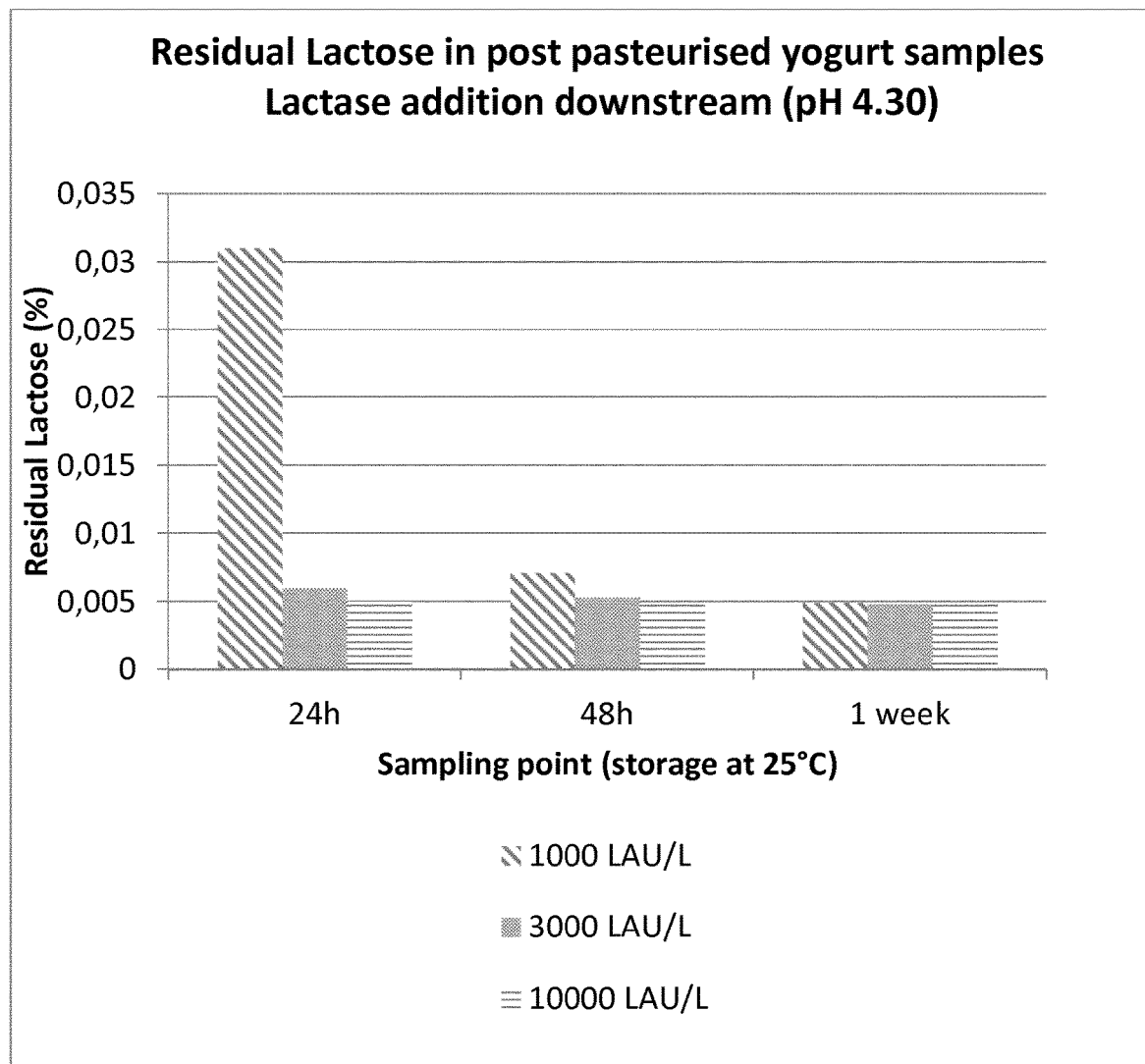
FIG. 1 shows the levels of residual lactose in samples treated with lactase added to a yogurt downstream of post pasteurization for lactase levels of 1000, 2000 and 3000 LAU/L.

Lactase Activity-Assay in Eppendorf Tubes at 37° C., pH 6.5

Principle:

Lactase hydrolyses lactose into glucose and galactose. Glucose is measured after a modified version of the common glucose oxidase/peroxidase assay (Werner, W. et al. (1970) *Z. analyt. Chem.* 252: 224).

LAU is defined as the amount of enzyme liberating 1 micromole of glucose per min at 37° C., pH 6.5 in M-buffer (M-buffer is defined in the description of the present patent application). Alternatively, the activity in LAU for a specific lactase may be determined by the method described here. The value obtained is compared to a standard curve run with a lactase of known activity, and the activity of the unknown sample calculated from this. The lactase of known activity may, e.g., be Lactozym obtained from Novozymes A/S, Denmark.

Solutions:

Assay buffer: 50 mM succinate, 50 mM HEPES, 50 mM CHES, 150 mM KCl, 2 mM $CaCl_2$, 1 mM $MgCl_2$, 0.01% Triton X100, pH 6.5

GOD-Perid solution: 65 mM sodium phosphate, pH 7, 0.4 g/l Glucose oxidase, 0.013 g/l HRP (Horse Radish Peroxidase), 0.65 g/l ABTS (2,2'-azino-bis(3-ethylbenzthiazoline-6-sulphonic acid)).

Substrate:

160 mM lactose, 50 mM succinate, 50 mM HEPES, 50 mM CHES, 150 mM KCl, 2 mM $CaCl_2$, 1 mom $MgCl_2$, pH 6.5.

Standard:

Lactozym (available from Novozymes A/S, Denmark) with a known activity in LAU/g is used as standard, diluted in assay buffer in the range from 0.09-0.7 LAU/g.

Samples:

Enzyme samples are diluted appropriately in assay buffer.

Procedure:

1. 375 μl substrate is incubated 5 minutes at 37° C.
2. 25 μl enzyme diluted in assay buffer is added.
3. The reaction is stopped after 30 minutes by adding 60 μl 1 M NaOH
4. 20 μl is transferred to a 96 well microtiter plate and 200 μl GOD-Perid solution is added. After 30 minutes at room temperature, the absorbance is measured at 420 nm.

Example 2

100 ml 15 or 30% (w/w) whey permeate containing primarily lactose and ions was made by mixing 15 or 30 g spray-dried whey permeate powder (Variolac, Arla) in 85 or 70 ml ionic water respectively. The solution was poured in a flask containing a magnetic stirring bar and placed in a water bath at 37° C. After 15 min, enzyme was added. Enzymes tested were Lactozym, a commercially available lactase from Novozymes A/S, Denmark, having an activity of 3060 LAU/g, and an experimental lactase from *Bifidobacterium bifidum* having the encoded sequence shown in SEQ ID NO: 2 and an activity of 295 LAU/g.

Dosages were 4225 LAU/l milk of Lactozym and 2025 LAU/l milk of the *Bifidobacterium* lactase. Milk samples were taken at regular intervals up till 5.5 hrs. and the enzyme was inactivated by heating to 99° C. for 10 min in a thermomixer. Samples were diluted appropriately and filtered through a 0.20 μm filter.

Lactose hydrolysis was measured using a Dionex BioLC equipped with a Dionex PA1 column and a Pulsed Amperiometrisk Detektor (PAD). Peaks were identified and quantified by comparing with known standards of lactose, glucose and galactose.

Results are given below.

TABLE 1

Lactose, glucose and galactose in 15% DS whey permeate after treatment with Lactozym or *Bifidobacterium* lactase.

| | Lactozym | | | *Bifidobacterium* lactase | | |
|---|---|---|---|---|---|---|
| Time min | Lactose mM | Glucose mM | Galactose mM | Lactose mM | Glucose mM | Galactose mM |
| 0 | 499 | 1 | 2 | 499 | 1 | 2 |
| 30 | 312 | 135 | 106 | 410 | 61 | 63 |
| 60 | 211 | 224 | 155 | 349 | 119 | 122 |
| 120 | 110 | 295 | 221 | 220 | 199 | 202 |
| 180 | 66 | 324 | 249 | 149 | 281 | 290 |
| 240 | 50 | 346 | 279 | 84 | 336 | 348 |
| 330 | 37 | 372 | 312 | 31 | 350 | 368 |

TABLE 2

Lactose, glucose and galactose in 30% DS whey permeate after treatment with Lactozym or *Bifidobacterium* lactase.

| | Lactozym | | | *Bifidobacterium* lactase | | |
|---|---|---|---|---|---|---|
| Time min | Lactose mM | Glucose mM | Galactose mM | Lactose mM | Glucose mM | Galactose mM |
| 0 | 848 | 1 | 4 | 848 | 1 | 4 |
| 30 | 824 | 109 | 75 | 819 | 43 | 45 |
| 60 | 615 | 253 | 150 | 788 | 86 | 83 |
| 120 | 420 | 370 | 242 | 651 | 159 | 158 |
| 180 | 291 | 459 | 300 | 625 | 232 | 230 |
| 240 | 246 | 559 | 373 | 501 | 283 | 273 |
| 330 | 154 | 544 | 367 | 391 | 333 | 324 |
| 1440 | 54 | 649 | 545 | 20 | 727 | 739 |

Also when tested at higher lactose concentrations as in 15% or 30% whey permeate no or very little galactooligosaccharides are produced. Again, the produced galactose and glucose levels are equal and match the amount of lactose hydrolyzed. For comparison, Lactozym produces less galactose than glucose, clearly showing that galactooligosaccharides have been produced.

Example 3 pH profile (at 37° C.) and temperature profile (at pH 6.5) of experimental lactase from *Bifidobacterium bifidum* using lactose as substrate.

Principle:
Lactase hydrolyses lactose and glucose+galactose is formed. Glucose is measured after a modified version of the common glucose oxidase/peroxidase assay (Werner, W. et al. (1970) *Z. analyt. Chem.* 252: 224.)

pH profile
Substrate:
167 mM lactose, 50 mM succinate, 50 mM HEPES, 50 mM CHES, 150 mM KCl, 2 mM CaCl$_2$, 1 mM MgCl$_2$ and pH adjusted to pH 3, 4, 5, 6, 7, 8, 9 and 10 with NaOH.
Enzyme Sample:
Experimental lactase from *Bifidobacterium bifidum* having the encoded sequence shown in SEQ ID NO: 2 was diluted appropriately in 150 mM KCl, 2 mM CaCl$_2$, 1 mM MgCl$_2$, 0.01% Triton X100.

Procedure:
10 µl enzyme sample diluted in enzyme dilution buffer was added to PCR tubes at room temp.
90 µl substrate was added at room temp. and quickly placed in a Peltier Thermal Cycler (PCT-200, MJ research) at 37° C. and incubated for 30 min and then placed on ice.
The reaction was stopped by adding 100 µl 0.25 M NaOH.
20 µl was transferred to a 96 well microtitre plate and 230 µl 65 mM sodium phosphate, pH 7, 0.4 g/l Glucose oxidase, 0.013 g/l HRP, 0.65 g/l ABTS solution was added. After 30 minutes at room temperature, the absorbance was measured at 420 nm.

TABLE 3

| pH | *B. bifidum* lactase relative activity (% of activity at pH 6) |
|---|---|
| 3 | 0 |
| 4 | 4 |
| 5 | 75 |
| 6 | 100 |
| 7 | 85 |
| 8 | 39 |
| 9 | 10 |
| 10 | 4 |

Temperature Profile
Substrate:
167 mM lactose, 50 mM succinate, 50 mM HEPES, 50 mM CHES, 150 mM KCl, 2 mM CaCl$_2$, 1 mM MgCl$_2$ and pH adjusted to pH 6.5 with NaOH.
Enzyme Sample:
Experimental lactase from *Bifidobacterium bifidum* having the encoded sequence shown in SEQ ID NO: 2 was diluted appropriately in 50 mM succinate, 50 mM HEPES, 50 mM CHES, 150 mM KCl, 2 mM CaCl$_2$, 1 mM MgCl$_2$, 0.01% Triton X100 and pH adjusted to pH 6.5.
Procedure:
10 µl enzyme sample diluted in enzyme dilution buffer was added to PCR tubes at room temp.
90 µl preheated (in a Peltier Thermal Cycler 30-70° C.) substrate was added and incubation was performed with a temp. gradient from 30-70° C. for 30 min. and then placed on ice.
The reaction was stopped by adding 100 µl 0.25 M NaOH.
20 µl was transferred to a 96 well microtitre plate and 230 µl 65 mM sodium phosphate, pH 7, 0.4 g/l Glucose oxidase, 0.013 g/l HRP, 0.65 g/l ABTS solution was added. After 30 minutes at room temperature, the absorbance was measured at 420 nm.

TABLE 4

| Temp. ° C. | *B. bifidum* lactase relative activity (% of activity at 38.1° C.) |
|---|---|
| 20 | 54 |
| 21 | 63 |
| 22 | 64 |
| 24 | 68 |
| 26 | 73 |
| 29 | 81 |
| 31 | 88 |
| 34 | 94 |
| 36 | 96 |
| 38 | 100 |
| 43 | 96 |
| 48 | 91 |

TABLE 4-continued

| Temp. °C. | B. bifidum lactase relative activity (% of activity at 38.1° C.) |
|---|---|
| 52 | 83 |
| 57 | 76 |
| 62 | 58 |
| 66 | 32 |
| 69 | 20 |
| 70 | 17 |

Example 4

Determination of Km for lactase enzymes at 5° C.
Principle:
Lactase hydrolyses lactose and glucose+galactose is formed. Glucose is measured after a modified version of the common glucose oxidase/peroxidase assay (Werner, W. et al. (1970) Z. analyt. Chem. 252: 224.)
Substrate:
Different lactose concentrations ranging from Km/5 to 10*Km, 50 mM succinate, 50 mM HEPES, 50 mM CHES, 150 mM KCl, 2 mM $CaCl_2$, 1 mM $MgCl_2$ and pH adjusted to pH 6.5 with NaOH.
Enzyme Sample:
Experimental lactase from Bifidobacterium bifidum having the encoded sequence shown in SEQ ID NO: 2 was diluted appropriately in 50 mM succinate, 50 mM HEPES, 50 mM CHES, 150 mM KCl, 2 mM $CaCl_2$, 1 mM $MgCl_2$, 0.01% Triton X100, pH adjusted to pH 6.5 with NaOH.
12 g/l Lactozym (commercially available lactase from Novozymes A/S, Denmark) was diluted 6000 times in the same buffer.
Procedure:
  10 µl enzyme sample (5° C.) was added to a 96 well microtitre plate on ice.
  90 µl substrate (5° C.) was added and incubated for 2 hours at 5° C.
The reaction was stopped by adding 100 µl 0.25 M NaOH.
20 µl was transferred to a 96 well microtitre plate and 230 µl 65 mM sodium phosphate, pH 7, 0.4 g/l Glucose oxidase, 0.013 g/l HRP, 0.65 g/l ABTS solution was added. After 30 minutes at room temperature, the absorbance was measured at 420 nm.
Km Determination:
Computerized nonlinear least-squares fitting and the Michaelis-Menten equation:

$$v=(V\max*S)/(Km+S)$$

was used. Km for the Bifidobacterium lactase and Lactozym were determined to be 8 mM and 30 mM, respectively.
In a similar test performed at 37° C., Km for the Bifidobacterium lactase and Lactozym were determined to be 13 mM and 30 mM, respectively.

Example 5

Production of post-pasteurized yogurt containing lactase added after pasteurization
Milk Substrate
Fat level 2.8%*
Protein level 2.8%*
Lactose 3.0%
Sucrose 5.0% (added)
Modified Starch E1442 Cargill type 75720 1.50%
Pectin type LMA CP Kelco type LM 106 AS-YA 0.25%
Gellan Gum type Kelcogel YSS 0.05%
  * Level in final product, i.e. after heat treatment, addition of the ambient storage strain and storage for 150 days.
Starter Culture
YoFlex® starter culture type FD-DVS YF-L904 containing the two strains Streptococcus thermophilus and Lactobacillus delbrueckii spp. bulgaricus.
Lactase
Lactase from Bifidobacterium bifidum having the encoded sequence of SEQ ID NO. 2 and an activity of 295 LAU/g.
Procedure for Producing Product
1. Dispersing the dry ingredients into the milk
2. Resting for 3 hours with gentle stirring
3. Heating the milk until a temperature of 65° C. is reached
4. Homogenization at 150 Bar
5. Heat treatment to 95° C. for 5 min.
6. Cooling to fermentation temperature 43° C.
7. Pump the milk into fermentation vat
8. Inoculation of YoFlex Culture type YF-L904.
9. Fermentation until pH reaches 4.30.
10. Break the curd and stir until smooth structure is obtained
11. Heat treatment at 75° C. for 30 sec.
12. Cooling to 25° C.
13. Adding the lactase at a level of 1420 LAU/L yogurt product and gently mixing the yogurt so as to distribute the lactase evenly in the yogurt.
14. Filling the yogurt into containers.
15. Storing the yogurt at a temperature of 20° C. for a period of 7 days.

Example 6

Downstream Addition of Lactase to Post Pasteurized Yogurt
The purpose of the experimental work carried out was to show that it is possible to add a suitable lactase after final heat treatment of post pasteurized yogurt to reach residual lactose levels of <0.01%.
Post pasteurized yogurt with a composition of 2.9% protein and 2.8% fat was produced. The milk substrate was fermented to pH of 4.30 with YoFlex Culture type YF-L904. After reaching a pH of 4.30 the yogurt was cooled down to 15° C. in a plate heat exchanger and kept in insulated buffer tank at 15° C. for three hours before performing the final heat treatment. The final heat treatment was done at 74° C., 20 s. in a plate heat exchanger, and the product was filled at 25° C. into sterile beakers. The samples were stored at ambient temperature (22° C.) for one day prior to addition of sterile lactase.
Milk Substrate

| Ingredients | Specification | Dosage |
|---|---|---|
| Fresh milk | 3.5% fat, commercial milk, Arla Foods | 74.15% |
| Water | | 16.6% |
| Sucrose | | 7.0% |
| Whey Protein Concentrate | Nutrilac YO-7830, Arla Food Ingredients | 0.60% |
| Modified starch | Clearam CJ 5025, Roquette | 1.50% |
| LM Pectin | LM 106-AS YA, CP Kelco | 0.12% |
| Gellan gum | Kelcogel YSS, CP Kelco | 0.03% |
| Cultures | FD-DVS YF-L904 | 200 units/metric tons |

Milkoscan analysis: Fat level 2.8% Protein level 2.9%

The following parameters were used for fermentation and processing:

Mixing temperature: 10° C.
Hydration time: 3 hours with gentle stirring
Lactase
Lactase from *Bifidobacterium bifidum* having the encoded sequence of SEQ ID NO. 2.
Starter Culture
YoFlex® Culture type YF-L904 from Chr. Hansen YoFlex® product range containing the two species *Streptococcus thermophilus* and *Lactobacillus delbrueckii* spp. *bulgaricus*.

Process for Producing Yogurt
Homogenization pressure: 150 bar
Pasteurization condition: 95° C., 5 minutes
Fermentation temperature: 43° C.
End pH: 4.30
Break the curd manually and stir until smooth structure is obtained.
Cooling to 15° C. in Plate heat exchanger
Thermisation in plate heat exchanger, flow 414 L/h
Homogenization pressure: 0 bar
Termisation condition: 74° C., 20 s
Filling into sterile 100 ml cups, filling temperature 25° C.
Lactase Addition The lactase was sterile filtered and added to 100 ml beakers of post pasteurized yogurt with the following dosages:

a) 0 LAU/L-Ref
b) 1000 LAU/L
c) 3000 LAU/L
d) 10000 LAU/L

The samples were stored at room temperature (22° C.) and samples were taken for residual lactose analysis at the following time points; 24 hours, 48 hours and 1 week.

Results

In FIG. 1 the residual lactose of the samples with lactase addition is shown. The residual lactose of the reference sample was measured to be 2.4% residual lactose. As will appear from FIG. 1 the lactose concentration decreased to a level of about 0.005% for lactose concentrations 3000 LAU/L and 10000 LAU/L after 24 hours from addition. Also, the lactose concentration decreased to a level of about 0.005% for all three lactase concentrations after 48 hours and after 1 week from addition.

Example 7

Downstream Addition of Lactase to Post Pasteurized Yogurt

The purpose of the experimental work carried out was to show that it is possible to add a suitable lactase after final heat treatment of post pasteurized yogurt to reach residual lactose levels of <0.1%.

Post pasteurized yogurt with a composition of 2.87% protein and 2.89% fat was produced. The milk substrate was fermented to pH of 4.30 with YoFlex Culture type YF-L904. After reaching a pH of 4.30 the yogurt was cooled down to 15° C. in a plate heat exchanger and kept in insulated buffer tank at 15° C. for three hours before performing the final heat treatment. The final heat treatment was done at 74° C., 20 s. in a plate heat exchanger, and the product was filled at 25° C. into sterile beakers. The samples were stored at 25° C. for one day prior to addition of sterile lactase.

Milk Substrate

| Ingredients | Specification | Dosage |
|---|---|---|
| Fresh milk | 3.5% fat, commercial milk, Arla Foods | 74.15% |
| Water | | 16.6% |
| Sucrose | | 7.0% |
| Whey Protein Concentrate | Nutrilac YO-7830, Arla Food Ingredients | 0.60% |
| Modified starch | Clearam CJ 5025, Roquette | 1.50% |
| LM Pectin | LM 106-AS YA, CP Kelco | 0.12% |
| Gellan gum | Kelcogel YSS, CP Kelco | 0.03% |
| Cultures | FD-DVS YF-L904 | 200 units/metric tons |

Milkoscan analysis: Fat level 2.87% Protein level 2.89%

The following parameters were used for fermentation and processing:

Mixing temperature: 10° C.
Hydration time: 3 hours with gentle stirring
Lactase
Lactase from *Bifidobacterium bifidum* having the encoded sequence of SEQ ID NO. 2.
Starter Culture
YoFlex® Culture type YF-L904 from Chr. Hansen YoFlex® product range containing the two species *Streptococcus thermophilus* and *Lactobacillus delbrueckii* spp. *bulgaricus*.

Process for Producing Yogurt
Homogenization pressure: 150 bar
Pasteurization condition: 95° C., 5 minutes
Fermentation temperature: 43° C.
End pH: 4.30
Break the curd manually and stir until smooth structure is obtained.
Cooling to 15° C. in Plate heat exchanger
Thermization in plate heat exchanger, flow 414 L/h
Thermization condition: 74° C., 20 s
Filling into sterile 100 ml cups, filling temperature 25° C.
Lactase Addition The lactase was sterile filtered and added to 100 ml beakers of post pasteurized yogurt with the following dosages:

a) 0 LAU/L-Ref
b) 200 LAU/L
c) 400 LAU/L
d) 600 LAU/L
e) 800 LAU/L
f) 1000 LAU/L
g) 1200 LAU/L

The samples were stored at 25° C. and samples were taken for residual lactose analysis at the following time points; 8 hours, 24 hours, 48 hours and 76 hours.

Results

Figure 2:
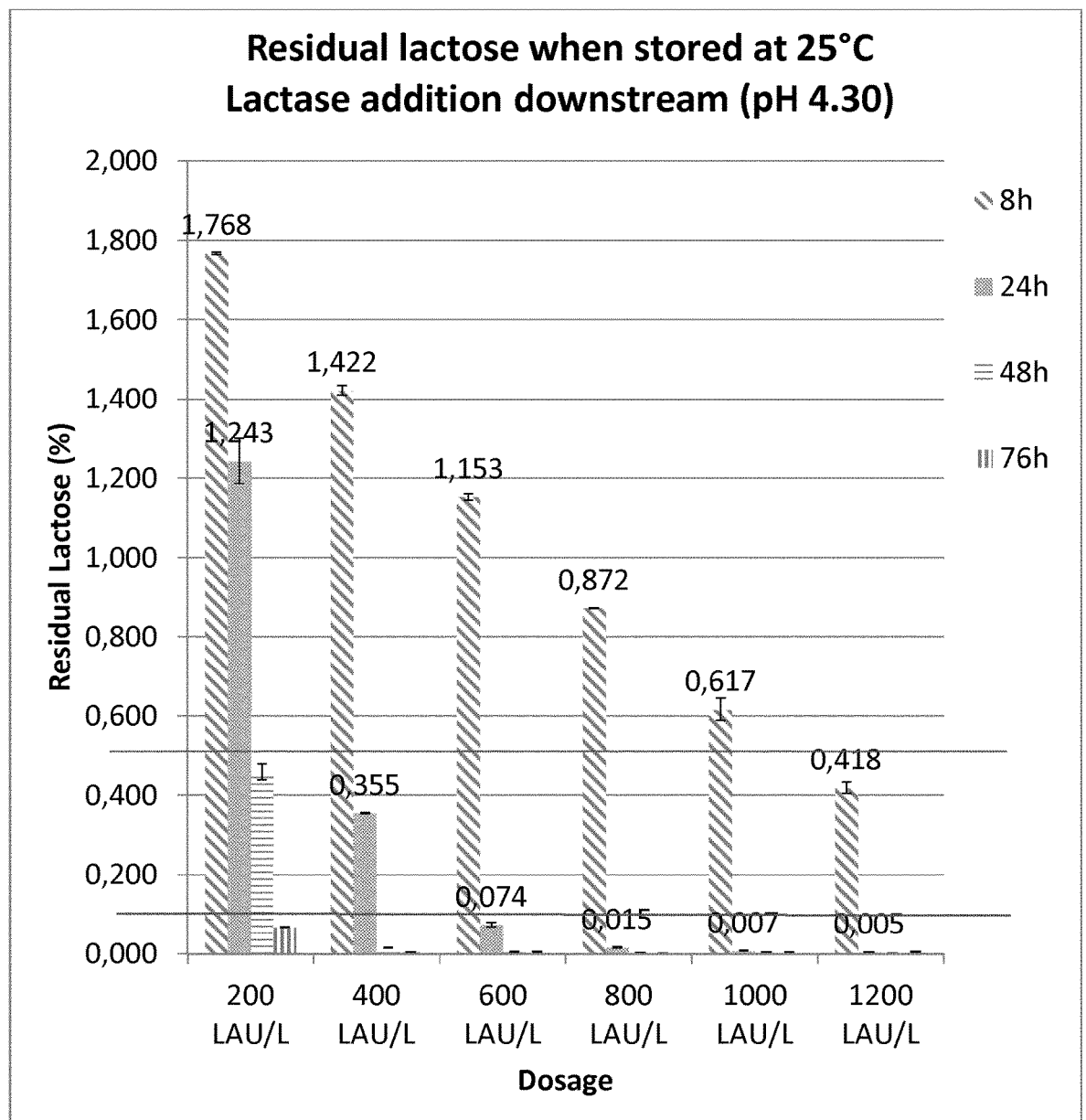
FIG. 2 shows the levels of residual lactose in samples treated with lactase added to a yogurt downstream of post pasteurization for lactase levels of 200, 400, 600, 800, 1000 and 1200 LAU/L at 8, 24, 48 and 76 hours.
Figure 3:
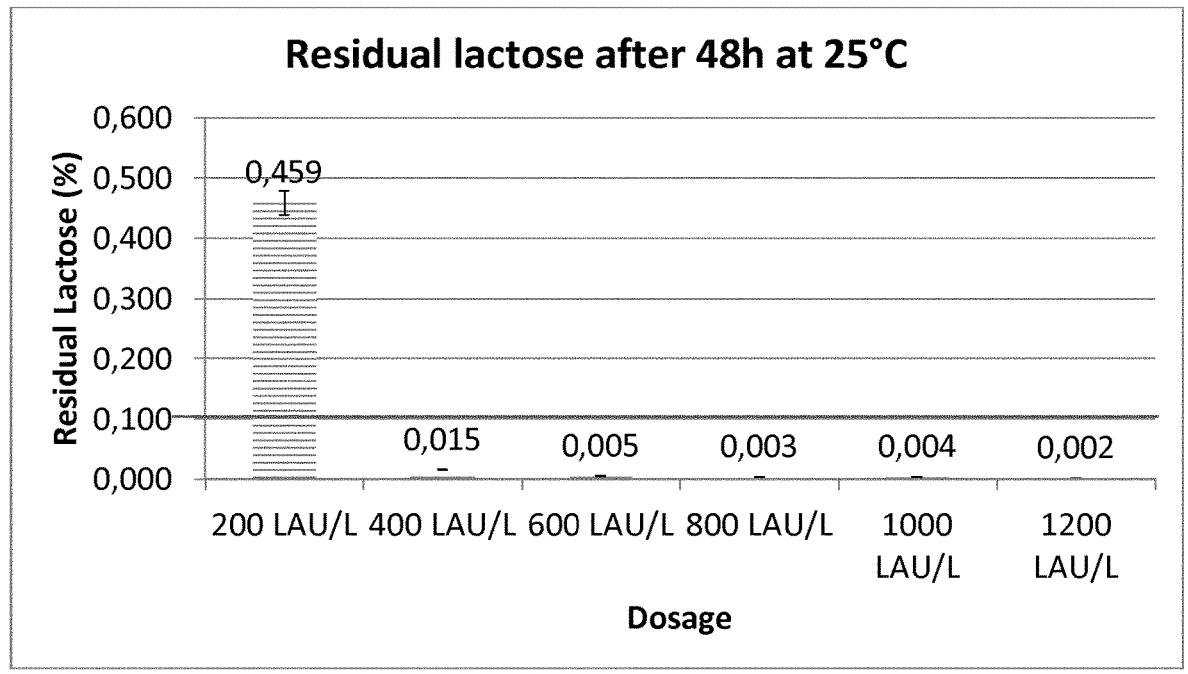
FIG. 3 shows the data of FIG. 2 at 48 hours only.
Figure 4:
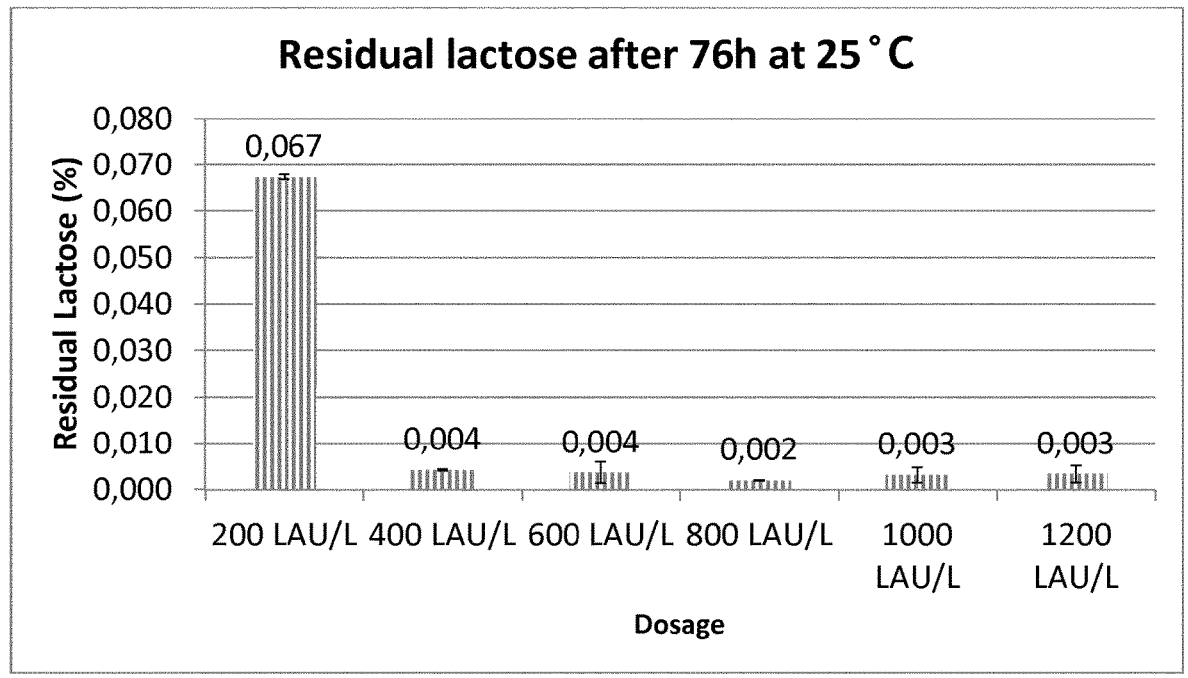
FIG. 4 shows the data of FIG. 2 at 76 hours only.

In FIGS. 2-4 the residual lactose of the samples with lactase addition is shown. The residual lactose of the reference sample was measured to be 2.4% residual lactose. The horizontal lines at a Residual Lactose level of 0.1 and 0.5 signifies the level of lactose, which according to food regulatory legislation qualifies as lactose-free in the EU and China, respectively.

As will appear from FIG. 2-4 the lactose concentration at 24 hours decreased to a level of about 0.355% for a lactase concentration of 400 LAU/L and to a level of below 0.01% for higher concentrations of lactase. At 48 hours, the lactose concentration had dropped to a level of 0.015% for a lactase concentration of 400 LAU/L and to a level of below 0.01% for higher concentrations of lactase. At 76 hours, the lactose concentration had dropped to a level of below 0.01% for a lactase concentration of 400 LAU/L and higher concentrations of lactase.

Thus, the present experiments show that it is possible to meet a target of residual lactose of 0.01% or below with a lactase dose of 600 LAU/I at 48 hours and a lactase dose of 400 LAU/I at 76 hours.

Example 8

Downstream Addition of Lactase to Post Pasteurized Yogurt at Different pH Levels (from 4.0 to 4.4)

The purpose of experimental work carried out was to show that in a process for removing lactose in Post Pasteurized Yogurt (PPY) using lactase it is possible to obtain a desired lactose removal for PPY with different pH in the range of 4.0 to 4.4.

Milk Substrate

| Ingredients | Specification | Dosage Standard Lactose | Dosage High Lactose |
|---|---|---|---|
| Fresh milk | 3.5% fat, commercial milk, Arla Foods | 74.30% | 74.0% |
| Water | | 16.45% | 15.95% |
| Sucrose | | 7.0% | 7.0% |
| Whey Protein Concentrate | Nutrilac YO-7830, Arla Food Ingredients | 0.60% | 0.60% |
| Modified starch | Clearam CJ 5025, Roquette | 1.50% | 1.5% |
| LM Pectin | LM 106-AS YA, CP Kelco | 0.12% | 0.12% |
| Gellan gum | Kelcogel YSS, CP Kelco | 0.03% | 0.03% |
| Cultures | FD-DVS YF-L904 | 200 units/ metric tons | 200 units/ metric tons |

Milkoscan Analysis:

Standard Lactose milk base: Fat level 2.88%, Protein level 2.91%

High Lactose milk base: Fat level 2.91%, Protein level 2.94%

Lactase

Lactase from *Bifidobacterium bifidum* having the encoded sequence of SEQ ID NO. 2.

Process for Producing Yogurt

Homogenization pressure: 150 bar at 60° C.

Pasteurization condition: 95° C., 5 minutes

Fermentation temperature: 43° C.

End pH for standard lactose milk base: 4.0, 4.1, 4.2, 4.3 and 4.4

End pH for high lactose milk base: 4.3

Break the curd manually and stir until smooth structure is obtained.

Cooling to 15° C. in Plate heat exchanger

Thermisation in plate heat exchanger, flow 414 L/h

Termisation condition: 74° C., 20 s

Filling into sterile 100 ml cups, filling temperature 25° C.

Lactase Addition

The lactase was sterile filtered and added to 100 ml beakers of post pasteurized yogurt with the following dosages:

a) 0 LAU/L-Ref b) 200 LAU/L c) 400 LAU/L d) 600 LAU/L e) 800 LAU/L

The samples were stored at 15° C., 20° C., 25° C. and 30° C. and samples were taken for residual lactose analysis at the following time points; 24 hours, 48 hours and 72 hours.

Results

For reasons of brevity only results for samples stored at 25° C. are shown. Corresponding results were obtained for samples stored at 15° C., 20° C. and 30° C.

TABLE 5

Residual lactose levels for samples stored at 25° C.

| Milk Base | End pH | Dosage of Lactase (LAU/L) | 24 Hours (%) | 48 hours (%) | 72 Hours (%) |
|---|---|---|---|---|---|
| Standard | 4.4 | 200 | 0.918 | 0.220 | 0.034 |
| Standard | 4.4 | 400 | 0.106 | 0.004 | 0.003 |
| Standard | 4.4 | 600 | 0.077 | 0.003 | 0.003 |
| Standard | 4.4 | 800 | 0.009 | <0.002 | 0.002 |
| Standard | 4.4 | 1000 | 0.004 | 0.002 | 0.002 |
| Standard | 4.3 | 200 | 1.322 | 0.567 | 0.223 |
| Standard | 4.3 | 400 | 0.566 | 0.043 | 0.008 |
| Standard | 4.3 | 600 | 0.063 | 0.005 | 0.004 |
| Standard | 4.3 | 800 | 0.015 | 0.003 | 0.003 |
| Standard | 4.3 | 1000 | 0.007 | <0.002 | 0.002 |
| Standard | 4.2 | 200 | 1.422 | 0.0803 | 0.356 |
| Standard | 4.2 | 400 | 0.671 | 0.071 | 0.013 |
| Standard | 4.2 | 600 | 0.177 | 0.008 | 0.004 |
| Standard | 4.2 | 800 | 0.128 | 0.005 | 0.003 |
| Standard | 4.2 | 1000 | ND | ND | ND |
| Standard | 4.1 | 200 | 1.719 | 1.177 | 0.808 |
| Standard | 4.1 | 400 | 0.923 | 0.266 | 0.051 |
| Standard | 4.1 | 600 | 0.572 | 0.066 | 0.019 |
| Standard | 4.1 | 800 | 0.245 | 0.010 | 0.005 |
| Standard | 4.1 | 1000 | 0.108 | 0.005 | 0.003 |
| Standard | 4.0 | 200 | 1.725 | 1.196 | 0.933 |
| Standard | 4.0 | 400 | 1.236 | 0.589 | 0.265 |
| Standard | 4.0 | 600 | 0.773 | 0.187 | 0.039 |
| Standard | 4.0 | 800 | 0.502 | 0.049 | 0.010 |
| Standard | 4.0 | 1000 | ND | ND | ND |
| High | 4.3 | 200 | 2.011 | 1.139 | 0.584 |
| High | 4.3 | 400 | 0.876 | 0.121 | 0.018 |
| High | 4.3 | 600 | 0.250 | 0.009 | 0.005 |
| High | 4.3 | 800 | 0.053 | 0.006 | 0.003 |
| High | 4.3 | 1000 | 0.017 | 0.004 | 0.003 |

TABLE 6

Residual lactose level with no addition of lactase.

| Milk Base | pH | Dosage of Lactase (LAU/L) | 24 Hours (%) |
| --- | --- | --- | --- |
| Standard | 4.4 | 0 | 2.6 |
| Standard | 4.3 | 0 | 2.7 |
| Standard | 4.2 | 0 | 2.6 |
| Standard | 4.1 | 0 | 2.5 |
| Standard | 4.0 | 0 | 2.5 |
| High | 4.3 | 0 | 3.2 |
| Standard (before fermentation) | | 0 | 3.3 |
| High (before fermentation) | | 0 | 4.0 |

As will appear from Table 5 and 6, the lower the end pH of the yogurt, the higher the residual lactose content is. The results further show that at the lowest end pH it is possible to reach a target of residual lactose of below 0.1% with a lactase dose of 800 LAU/L at 48 hours. Furthermore, at an end pH of 4.1 it is possible to reach a residual lactose of 0.108% with a lactase dose of 1000 LAU/L at 24 hours.

Example 9

Downstream Addition of Lactase to Post Pasteurized Yogurt at Low Levels of Added Lactase The purpose of experimental work carried out was to test the effectiveness of low dosages of lactase in a process for removing lactose in Post Pasteurized Yogurt (PPY) using lactase in order to establish the minimum dose required to obtain a desired target of residual lactose.

Milk Substrate

| Ingredients | Specification | Dosage |
| --- | --- | --- |
| Fresh milk | 3.5% fat, commercial milk, Arla Foods | 74.30% |
| Water | | 16.45% |
| Sucrose | | 7.0% |
| Whey Protein Concentrate | Nutrilac YO-7830, Arla Food Ingredients | 0.60% |
| Modified starch | Clearam CJ 5025, Roquette | 1.50% |
| LM Pectin | LM 106-AS YA, CP Kelco | 0.12% |
| Gellan gum | Kelcogel YSS, CP Kelco | 0.03% |
| Cultures | FD-DVS YF-L904 | 200 units/metric tons |

Milkoscan Analysis:

Milk Base: Fat Level 2.81%, Protein Level 3.11%

Lactase

Lactase from *Bifidobacterium bifidum* having the encoded sequence of SEQ ID NO. 2.

Process for Producing Yogurt

Homogenization pressure: 150 bar at 60° C.

Pasteurization condition: 95° C., 5 minutes

Fermentation temperature: 43° C.

End pH for standard lactose milk base: 4.15, 4.20, 4.25 and 4.30

End pH for high lactose milk base: 4.3

Break the curd manually and stir until smooth structure is obtained.

Cooling to 15° C. in Plate heat exchanger

Thermisation in plate heat exchanger, flow 414 L/h

Termisation condition: 74° C., 20 s

Filling into sterile 100 ml cups, filling temperature 25° C.

Lactase Addition

The lactase was sterile filtered and added to 100 ml beakers of post pasteurized yogurt with the following dosages:

a) 0 LAU/L-Ref
b) 50 LAU/L
c) 100 LAU/L
d) 200 LAU/L
e) 300 LAU/L

The samples were stored at 25° C. and samples were taken for residual lactose analysis at the following time points; 24 hours, 48 hours and 72 hours.

Results

For reasons of brevity only results for samples stored at 25° C. are shown. Corresponding results were obtained for samples stored at 15° C., 20° C. and 30° C.

TABLE 7

Residual lactose levels for samples

| Milk Base | End pH | Dosage of Lactase (LAU/L) | 24 Hours (%) | 48 hours (%) | 72 Hours (%) |
| --- | --- | --- | --- | --- | --- |
| Standard | 4.30 | 50 | 2.1 | 1.8 | 1.5 |
| Standard | 4.25 | 100 | 1.8 | 1.3 | 0.9 |
| Standard | 4.20 | 100 | 1.9 | 1.4 | 1.1 |
| Standard | 4.15 | 100 | 1.9 | 1.5 | 1.2 |
| Standard | 4.30 | 200 | 1.2 | 0.4 | 0.087 |
| Standard | 4.25 | 200 | 1.1 | 0.5 | 0.119 |
| Standard | 4.20 | 200 | 1.4 | 0.7 | 0.237 |
| Standard | 4.15 | 200 | 1.4 | 0.7 | 0.317 |
| Standard | 4.30 | 300 | 0.7 | 0.055 | 0.010 |
| Standard | 4.25 | 300 | 0.8 | 0.102 | 0.017 |
| Standard | 4.20 | 300 | 0.9 | 0.2 | 0.037 |
| Standard | 4.15 | 300 | 1.0 | 0.3 | 0.081 |

The pasteurized yogurt base with a pH of 4.3, 4.25, 4.20 and 4.15 and with no added lactase had a lactose level of 2.57, 2.52, 2.47 and 2.40, respectively.

As will appear from Table 7, it is possible to reach a target of residual lactose of below 0.5% with a lactase dose of 200 LAU/L at 48 hours for samples with a pH of 4.3 and 4.25 and with a lactase level of below 0.3 with a lactase dose of 300 LAU/L at 48 hours for all samples tested.

Example 10

Production of Acid Whey Beverage with Low Level of Lactose by Addition of Lactase The objective of the experimental work carried out was to show that it is possible to remove lactose from an acid whey permeate and investigate the effect of various lactase dosages, reaction times and temperatures.

Milk Substrate

| Ingredients | Specification | Dosage (g/1000 g) |
|---|---|---|
| Acid whey | Acid whey permeate (side-product from production of Skyr) | 800 |

-continued

| Ingredients | Specification | Dosage (g/1000 g) |
|---|---|---|
| Sucrose | Nordic Sugar | 70 |
| Water (ionized) | | 90 |
| HM Pectin | YM-115-H, CP-Kelco | 4.5 |
| Sum | | 979.5 |

Acid whey permeate (from ultrafiltration) is a side-product from production of Skyr.

The acid whey permeate had the following composition:
Protein 0.2%
Sugars 3.7%
Fat 0.01%
Ash 0.8%
Moisture 94.7%
pH 4.27
Lactase
Lactase from *Bifidobacterium bifidum* having the encoded sequence of SEQ ID NO. 2.

Process
1. Heat acid permeate to 72° C./2 min.
2. Cooling to
   a. 5° C. (2×1000 ml)
   b. 40° C. (3×1000 ml)
3. Dosing of lactase:
   a. 5° C.: 2500 and 5000 LAU/L (2×1000 ml)
   b. 40° C.: 500, 1000 and 2500 LAU/L (3×1000 ml)
4. Samples for analyzing lactose:
   a. Before addition of lactase
   b. At 40° C. and 2500 LAU/L: every 1 hour from 3 to 7 hours and 24 hours
   c. Other samples: 24 hours.
5. Processing of beverage based on acid whey
   a. Addition of HM pectin solution, flavor and sucrose.
   b. Adjust pH to 3.9 by citric acid
   c. Heat to 80° C. 2 min.
   d. Homogenization at 150 bar at 80° C.
   e. Filling into bottles.

Results

TABLE 8

Residual lactose levels (g/L) for test samples

| | Temp. | | | | | |
|---|---|---|---|---|---|---|
| | 5° C. | 5° C. | 5° C. | 40° C. | 40° C. | 40° C. |
| | Lactase (LAU/L) | | | | | |
| | 0 | 2500 | 5000 | 0 | 500 | 1000 | 2500 |
| 0 hours | 2.7235 | | | 2.7235 | | | |
| 1 Hours | | | | | | | |
| 2 Hours | | | | | | | |
| 3 Hours | | | | | | | 1.7793 |
| 4 Hours | | | | | | | 0.5527 |
| 5 Hours | | | | | | | 0.3117 |
| 6 Hours | | | | | | | 0.1681 |
| 7 Hours | | | | | | | 0.1376 |
| 24 Hours | | 0.5646 | 0.1018 | | 0.4381 | 0.0830 | 0.0378 |

As will appear from Table 8, it was possible to reduce the level of lactose to levels around 0.1 g/L for test samples at a temperature of 40° C. and for lactase concentrations of 1000 and 2500 LAU/L as well as at a temperature of 5° C. for a lactase concentration of 5000 LAU/L. For the two other samples it was possible to reduce the level of lactose to levels below 0.5 g/L.

SEQUENCE LISTING

SEQ ID NO.: 1 shows the sequence of a mutant of SEQ ID NO. 4.

SEQ ID NO.: 2 shows the sequence of a mutant of SEQ ID NO. 4.

SEQ ID NO.: 3 shows the sequence of a lactase from *Bifidobacterium bifidum* DSM20215.

SEQ ID NO.: 4 shows the sequence of a lactase from *Bifidobacterium bifidum* NCIMB41171, the nucleotide sequence of which is listed in NCBI with the accession number DQ448279.

SEQ ID NO: 4 is discussed in the following references, wherein it is referred to as bbgIII:

Appl Microbiol Biotechnol (2007) 76:1365-1372, T K Goulas et al.

Appl Microbiol Biotechnol (2009) 82:1079-1088, T Goulas et al.

Appl Microbiol Biotechnol (2009) 84:899-907, T Goulas et al.

The invention claimed is:

1. An acidified milk product, produced by a process comprising:
   chemically acidifying or fermenting a milk substrate with a starter culture to obtain an acidified milk product having a pH of between 3.0 and 5.0 and a lactose content of at least 1.5 mg/ml,
   subjecting the acidified milk product to heat treatment after chemical acidification or fermentation to achieve a level of bacteria in the acidified milk product of no more than $1\times10^2$ CFU/g, and
   adding a lactase to the acidified milk product after the heat treatment, wherein the lactase exhibits an activity at a pH of 5.0 and a temperature of 37° C. that is at least 5% of its activity at its optimum pH,
   wherein the acidified milk product has a pH of between 3.0 and 5.0, contains the lactase, and contains no more than $1\times10^2$ CFU/g bacteria.

2. The acidified milk product according to claim 1, wherein the lactase exhibits an activity at a temperature of 10° C. and a pH of 6.0 that is at least 10% of its activity at its optimum temperature.

3. The acidified milk product according to claim 1, wherein the product contains the lactase in an amount of between 100 and 20000 LAU per liter milk product.

4. The acidified milk product according to claim 1, wherein the product contains an acid whey product selected from the group consisting of acid whey and acid whey permeate.

5. The acidified milk product according to claim 1, wherein the lactase is a lactase originating from *Bifidobacterium bifidum*.

6. The acidified milk product according to claim 5, wherein the lactase originating from *Bifidobacterium bifidum* comprises an amino acid sequence which is at least 95% identical to a sequence selected from the group consisting of amino acids 28-1931 of SEQ ID NO: 1, amino acids 28-1331 of SEQ ID NO: 2, SEQ ID NO: 3, SEQ ID NO: 4, and lactase active fragments of any thereof.

7. The acidified milk product according to claim 5, wherein the lactase originating from *Bifidobacterium bifidum* comprises an amino acid sequence selected from amino acids 28-1931 of SEQ ID NO: 1, amino acids 28-979 of SEQ ID NO: 1, amino acids 28 1170 of SEQ ID NO: 1, amino acids 28-1323 of SEQ ID NO: 1, amino acids 28-1331 of SEQ ID NO: 1, amino acids 28-1600 of SEQ ID NO: 1, amino acids 28-1331 of SEQ ID NO: 2, SEQ ID NO: 3, and SEQ ID NO: 4.

8. A process for producing a chemically acidified or fermented milk product, comprising
   subjecting a chemically acidified or fermented milk product having a pH of between 3.0 and 5.0 and a lactose content of at least 1.5 mg/ml to heat treatment to achieve a level of bacteria in the product of no more than $1\times10^2$ CFU per g, to obtain a heat-treated chemically acidified or fermented milk product having a pH of between 3.0 and 5.0 and a lactose content of at least 1.5 mg/ml,
   adding a lactase to the heat-treated chemically acidified or fermented milk product, wherein the lactase exhibits an activity at a pH of 5.0 and a temperature of 37° C. that is at least 5% of its activity at its optimum pH, to obtain a lactase-containing chemically acidified or fermented milk product, and storing the lactase-containing chemically acidified or fermented milk product at a temperature of at least 2° C. for at least 1 day.

9. A process according to claim 8, wherein the lactase is a lactase originating from *Bifidobacterium bifidum*.

10. A process according to claim 9, wherein the lactase originating from *Bifidobacterium bifidum* comprises an amino acid sequence which is at least 95% identical to a sequence selected from the group consisting of amino acids 28-1931 of SEQ ID NO: 1, amino acids 28-1331 of SEQ ID NO: 2, SEQ ID NO: 3, SEQ ID NO: 4, and lactase active fragments of any thereof.

11. A process according to claim 9, wherein the lactase originating from *Bifidobacterium bifidum* comprises an amino acid sequence selected from amino acids 28-1931 of SEQ ID NO: 1, amino acids 28-979 of SEQ ID NO: 1, amino acids 28 1170 of SEQ ID NO: 1, amino acids 28-1323 of SEQ ID NO: 1, amino acids 28-1331 of SEQ ID NO: 1, amino acids 28-1600 of SEQ ID NO: 1, amino acids 28-1331 of SEQ ID NO: 2, SEQ ID NO: 3, and SEQ ID NO: 4.

12. A process according to claim 8, wherein the product is a fermented milk product and the method further comprises, prior to the heat treatment, fermenting a milk substrate using a starter culture of lactic acid bacteria to obtain the fermented milk product which has a pH of between 3.0 and 5.0 and a content of lactose of at least 1.5 mg/ml.

13. A process according to claim 12, wherein the lactase-containing fermented milk product is stored at a temperature of at least 15° C.

14. A process according to claim 12, wherein the lactase-containing fermented milk product is stored for at least 7 days.

15. A process according to claim 12, further comprising, after the fermenting and prior to the heat treatment, subjecting the fermented milk product to a concentration step to divide the fermented milk product into a concentrated fraction and a separated acid whey fraction, wherein the separated acid whey fraction is subjected to the subsequent steps of the process.

16. A process for reducing lactose in an acidified milk product during storage, comprising
subjecting an acidified milk product having a pH of between 3.0 and 5.0 and a lactose content of at least 1.5 mg/ml to heat treatment to achieve a level of bacteria in the acidified milk product of no more than $1\times10^2$ CFU per g, to obtain a heat-treated acidified milk product having a pH of between 3.0 and 5.0 and a lactose content of at least 1.5 mg/ml, and
adding a lactase to the heat-treated acidified milk product, wherein the lactase exhibits an activity at a pH of 5.0 and a temperature of 37° C. that is at least 5% of its activity at its optimum pH.

17. A process according to claim 16, wherein the lactase is a lactase originating from *Bifidobacterium bifidum*.

18. A process according to claim 17, wherein the lactase originating from *Bifidobacterium bifidum* comprises an amino acid sequence selected from amino acids 28-1931 of SEQ ID NO: 1, amino acids 28-979 of SEQ ID NO: 1, amino acids 28 1170 of SEQ ID NO: 1, amino acids 28-1323 of SEQ ID NO: 1, amino acids 28-1331 of SEQ ID NO: 1, amino acids 28-1600 of SEQ ID NO: 1, amino acids 28-1331 of SEQ ID NO: 2, SEQ ID NO: 3, and SEQ ID NO: 4.

19. A process according to claim 17, wherein the lactase originating from *Bifidobacterium bifidum* comprises an amino acid sequence which is at least 95% identical to a sequence selected from the group consisting of amino acids 28-1931 of SEQ ID NO: 1, amino acids 28-1331 of SEQ ID NO: 2, SEQ ID NO: 3, SEQ ID NO: 4, and lactase active fragments of any thereof.

* * * * *

SEQUENCE LISTING

<160> NUMBER OF SEQ ID NOS: 4

<210> SEQ ID NO 1
<211> LENGTH: 1931
<212> TYPE: PRT
<213> ORGANISM: Bifidobacterium bifidum

<400> SEQUENCE: 1

```
Met Lys Lys Pro Leu Gly Lys Ile Val Ala Ser Thr Ala Leu Leu Ile
1               5                   10                  15

Ser Val Ala Phe Ser Ser Ile Ala Ser Ala Ala Val Glu Asp Ala
            20                  25                  30

Thr Arg Ser Asp Ser Thr Thr Gln Met Ser Ser Thr Pro Glu Val Ala
            35                  40                  45

Tyr Ser Ser Ala Val Asp Ser Lys Gln Asn Arg Thr Ser Asp Phe Asp
        50                  55                  60

Ala Asn Trp Lys Phe Met Leu Ser Asp Ser Val Gln Ala Gln Asp Pro
65                  70                  75                  80

Ala Phe Asp Asp Ser Ala Trp Gln Gln Val Asp Leu Pro His Asp Tyr
                85                  90                  95

Ser Ile Thr Gln Lys Tyr Ser Gln Ser Asn Glu Ala Glu Ser Ala Tyr
            100                 105                 110

Leu Pro Gly Gly Thr Gly Trp Tyr Arg Lys Ser Phe Thr Ile Asp Arg
        115                 120                 125

Asp Leu Ala Gly Lys Arg Ile Ala Ile Asn Phe Asp Gly Val Tyr Met
    130                 135                 140

Asn Ala Thr Val Trp Phe Asn Gly Val Lys Leu Gly Thr His Pro Tyr
145                 150                 155                 160

Gly Tyr Ser Pro Phe Ser Phe Asp Leu Thr Gly Asn Ala Lys Phe Gly
                165                 170                 175

Gly Glu Asn Thr Ile Val Val Lys Val Glu Asn Arg Leu Pro Ser Ser
            180                 185                 190

Arg Trp Tyr Ser Gly Ser Gly Ile Tyr Arg Asp Val Thr Leu Thr Val
        195                 200                 205

Thr Asp Gly Val His Val Gly Asn Asn Gly Val Ala Ile Lys Thr Pro
    210                 215                 220

Ser Leu Ala Thr Gln Asn Gly Gly Asp Val Thr Met Asn Leu Thr Thr
225                 230                 235                 240

Lys Val Ala Asn Asp Thr Glu Ala Ala Asn Ile Thr Leu Lys Gln
                245                 250                 255

Thr Val Phe Pro Lys Gly Gly Lys Thr Asp Ala Ala Ile Gly Thr Val
            260                 265                 270

Thr Thr Ala Ser Lys Ser Ile Ala Ala Gly Ala Ser Ala Asp Val Thr
        275                 280                 285

Ser Thr Ile Thr Ala Ala Ser Pro Lys Leu Trp Ser Ile Lys Asn Pro
    290                 295                 300

Asn Leu Tyr Thr Val Arg Thr Glu Val Leu Asn Gly Gly Lys Val Leu
305                 310                 315                 320

Asp Thr Tyr Asp Thr Glu Tyr Gly Phe Arg Trp Thr Gly Phe Asp Ala
                325                 330                 335

Thr Ser Gly Phe Ser Leu Asn Gly Glu Lys Val Lys Leu Lys Gly Val
            340                 345                 350

Ser Met His His Asp Gln Gly Ser Leu Gly Ala Val Ala Asn Arg Arg
        355                 360                 365
```

```
Ala Ile Glu Arg Gln Val Glu Ile Leu Gln Lys Met Gly Val Asn Ser
    370                 375                 380

Ile Arg Thr Thr His Asn Pro Ala Ala Lys Ala Leu Ile Asp Val Cys
385                 390                 395                 400

Asn Glu Lys Gly Val Leu Val Glu Val Phe Asp Met Trp Asn
                405                 410                 415

Arg Ser Lys Asn Gly Asn Thr Glu Asp Tyr Gly Lys Trp Phe Gly Gln
            420                 425                 430

Ala Ile Ala Gly Asp Asn Ala Val Leu Gly Gly Asp Lys Asp Glu Thr
                435                 440                 445

Trp Ala Lys Phe Asp Leu Thr Ser Thr Ile Asn Arg Asp Arg Asn Ala
    450                 455                 460

Pro Ser Val Ile Met Trp Ser Leu Gly Asn Glu Met Met Glu Gly Ile
465                 470                 475                 480

Ser Gly Ser Val Ser Gly Phe Pro Ala Thr Ser Ala Lys Leu Val Ala
                485                 490                 495

Trp Thr Lys Ala Ala Asp Ser Thr Arg Pro Met Thr Tyr Gly Asp Asn
            500                 505                 510

Lys Ile Lys Ala Asn Trp Asn Glu Ser Asn Thr Met Gly Asp Asn Leu
                515                 520                 525

Thr Ala Asn Gly Gly Val Val Gly Thr Asn Tyr Ser Asp Gly Ala Asn
    530                 535                 540

Tyr Asp Lys Ile Arg Thr Thr His Pro Ser Trp Ala Ile Tyr Gly Ser
545                 550                 555                 560

Glu Thr Ala Ser Ala Ile Asn Ser Arg Gly Ile Tyr Asn Arg Thr Thr
                565                 570                 575

Gly Gly Ala Gln Ser Ser Asp Lys Gln Leu Thr Ser Tyr Asp Asn Ser
            580                 585                 590

Ala Val Gly Trp Gly Ala Val Ala Ser Ser Ala Trp Tyr Asp Val Val
                595                 600                 605

Gln Arg Asp Phe Val Ala Gly Thr Tyr Val Trp Thr Gly Phe Asp Tyr
    610                 615                 620

Leu Gly Glu Pro Thr Pro Trp Asn Gly Thr Gly Ser Gly Ala Val Gly
625                 630                 635                 640

Ser Trp Pro Ser Pro Lys Asn Ser Tyr Phe Gly Ile Val Asp Thr Ala
                645                 650                 655

Gly Phe Pro Lys Asp Thr Tyr Tyr Phe Tyr Gln Ser Gln Trp Asn Asp
            660                 665                 670

Asp Val His Thr Leu His Ile Leu Pro Ala Trp Asn Glu Asn Val Val
                675                 680                 685

Ala Lys Gly Ser Gly Asn Asn Val Pro Val Val Tyr Thr Asp Ala
    690                 695                 700

Ala Lys Val Lys Leu Tyr Phe Thr Pro Lys Gly Ser Thr Glu Lys Arg
705                 710                 715                 720

Leu Ile Gly Glu Lys Ser Phe Thr Lys Lys Thr Thr Ala Ala Gly Tyr
                725                 730                 735

Thr Tyr Gln Val Tyr Glu Gly Ser Asp Lys Asp Ser Thr Ala His Lys
            740                 745                 750

Asn Met Tyr Leu Thr Trp Asn Val Pro Trp Ala Glu Gly Thr Ile Ser
                755                 760                 765

Ala Glu Ala Tyr Asp Glu Asn Asn Arg Leu Ile Pro Glu Gly Ser Thr
    770                 775                 780

Glu Gly Asn Ala Ser Val Thr Thr Thr Gly Lys Ala Ala Lys Leu Lys
```

```
            785                 790                 795                 800
Ala Asp Ala Asp Arg Lys Thr Ile Thr Ala Asp Gly Lys Asp Leu Ser
                    805                 810                 815
Tyr Ile Glu Val Asp Val Thr Asp Ala Asn Gly His Ile Val Pro Asp
                    820                 825                 830
Ala Ala Asn Arg Val Thr Phe Asp Val Lys Gly Ala Gly Lys Leu Val
                    835                 840                 845
Gly Val Asp Asn Gly Ser Ser Pro Asp His Asp Ser Tyr Gln Ala Asp
            850                 855                 860
Asn Arg Lys Ala Phe Ser Gly Lys Val Leu Ala Ile Val Gln Ser Thr
865                 870                 875                 880
Lys Glu Ala Gly Glu Ile Thr Val Thr Ala Lys Ala Asp Gly Leu Gln
                    885                 890                 895
Ser Ser Thr Val Lys Ile Ala Thr Ala Val Pro Gly Thr Ser Thr
                900                 905                 910
Glu Lys Thr Val Arg Ser Phe Tyr Tyr Ser Arg Asn Tyr Tyr Val Lys
            915                 920                 925
Thr Gly Asn Lys Pro Ile Leu Pro Ser Asp Val Glu Val Arg Tyr Ser
        930                 935                 940
Asp Gly Thr Ser Asp Arg Gln Asn Val Thr Trp Asp Ala Val Ser Asp
945                 950                 955                 960
Asp Gln Ile Ala Lys Ala Gly Ser Phe Ser Val Ala Gly Thr Val Ala
                    965                 970                 975
Gly Gln Lys Ile Ser Val Arg Val Thr Met Ile Asp Glu Ile Gly Ala
                980                 985                 990
Leu Leu Asn Tyr Ser Ala Ser Thr Pro Val Gly Thr Pro Ala Val Leu
            995                 1000                1005
Pro Gly Ser Arg Pro Ala Val Leu Pro Asp Gly Thr Val Thr Ser
        1010                1015                1020
Ala Asn Phe Ala Val His Trp Thr Lys Pro Ala Asp Thr Val Tyr
        1025                1030                1035
Asn Thr Ala Gly Thr Val Lys Val Pro Gly Thr Ala Thr Val Phe
        1040                1045                1050
Gly Lys Glu Phe Lys Val Thr Ala Thr Ile Arg Val Gln Arg Ser
        1055                1060                1065
Gln Val Thr Ile Gly Ser Ser Val Ser Gly Asn Ala Leu Arg Leu
        1070                1075                1080
Thr Gln Asn Ile Pro Ala Asp Lys Gln Ser Asp Thr Leu Asp Ala
        1085                1090                1095
Ile Lys Asp Gly Ser Thr Thr Val Asp Ala Asn Thr Gly Gly Gly
        1100                1105                1110
Ala Asn Pro Ser Ala Trp Thr Asn Trp Ala Tyr Ser Lys Ala Gly
        1115                1120                1125
His Asn Thr Ala Glu Ile Thr Phe Glu Tyr Ala Thr Glu Gln Gln
        1130                1135                1140
Leu Gly Gln Ile Val Met Tyr Phe Phe Arg Asp Ser Asn Ala Val
        1145                1150                1155
Arg Phe Pro Asp Ala Gly Lys Thr Lys Ile Gln Ile Ser Ala Asp
        1160                1165                1170
Gly Lys Asn Trp Thr Asp Leu Ala Ala Thr Glu Thr Ile Ala Ala
        1175                1180                1185
Gln Glu Ser Ser Asp Arg Val Lys Pro Tyr Thr Tyr Asp Phe Ala
        1190                1195                1200
```

-continued

```
Pro Val Gly Ala Thr Phe Val Lys Val Thr Val Thr Asn Ala Asp
    1205            1210                1215
Thr Thr Thr Pro Ser Gly Val Val Cys Ala Gly Leu Thr Glu Ile
    1220            1225                1230
Glu Leu Lys Thr Ala Thr Ser Lys Phe Val Thr Asn Thr Ser Ala
    1235            1240                1245
Ala Leu Ser Ser Leu Thr Val Asn Gly Thr Lys Val Ser Asp Ser
    1250            1255                1260
Val Leu Ala Ala Gly Ser Tyr Asn Thr Pro Ala Ile Ile Ala Asp
    1265            1270                1275
Val Lys Ala Glu Gly Glu Gly Asn Ala Ser Val Thr Val Leu Pro
    1280            1285                1290
Ala His Asp Asn Val Ile Arg Val Ile Thr Glu Ser Glu Asp His
    1295            1300                1305
Val Thr Arg Lys Thr Phe Thr Ile Asn Leu Gly Thr Glu Gln Glu
    1310            1315                1320
Phe Pro Ala Asp Ser Asp Glu Arg Asp Tyr Pro Ala Ala Asp Met
    1325            1330                1335
Thr Val Thr Val Gly Ser Glu Gln Thr Ser Gly Thr Ala Thr Glu
    1340            1345                1350
Gly Pro Lys Lys Phe Ala Val Asp Gly Asn Thr Ser Thr Tyr Trp
    1355            1360                1365
His Ser Asn Trp Thr Pro Thr Thr Val Asn Asp Leu Trp Ile Ala
    1370            1375                1380
Phe Glu Leu Gln Lys Pro Thr Lys Leu Asp Ala Leu Arg Tyr Leu
    1385            1390                1395
Pro Arg Pro Ala Gly Ser Lys Asn Gly Ser Val Thr Glu Tyr Lys
    1400            1405                1410
Val Gln Val Ser Asp Asp Gly Thr Asn Trp Thr Asp Ala Gly Ser
    1415            1420                1425
Gly Thr Trp Thr Thr Asp Tyr Gly Trp Lys Leu Ala Glu Phe Asn
    1430            1435                1440
Gln Pro Val Thr Thr Lys His Val Arg Leu Lys Ala Val His Thr
    1445            1450                1455
Tyr Ala Asp Ser Gly Asn Asp Lys Phe Met Ser Ala Ser Glu Ile
    1460            1465                1470
Arg Leu Arg Lys Ala Val Asp Thr Thr Asp Ile Ser Gly Ala Thr
    1475            1480                1485
Val Thr Val Pro Ala Lys Leu Thr Val Asp Arg Val Asp Ala Asp
    1490            1495                1500
His Pro Ala Thr Phe Ala Thr Lys Asp Val Thr Val Thr Leu Gly
    1505            1510                1515
Asp Ala Thr Leu Arg Tyr Gly Val Asp Tyr Leu Leu Asp Tyr Ala
    1520            1525                1530
Gly Asn Thr Ala Val Gly Lys Ala Thr Val Thr Val Arg Gly Ile
    1535            1540                1545
Asp Lys Tyr Ser Gly Thr Val Ala Lys Thr Phe Thr Ile Glu Leu
    1550            1555                1560
Lys Asn Ala Pro Ala Pro Glu Pro Thr Leu Thr Ser Val Ser Val
    1565            1570                1575
Lys Thr Lys Pro Ser Lys Leu Thr Tyr Val Val Gly Asp Ala Phe
    1580            1585                1590
```

-continued

```
Asp Pro Ala Gly Leu Val Leu Gln Leu Asn Tyr Asp Asp Asp Ser
    1595                1600                1605

Thr Gly Thr Val Thr Trp Asn Thr Gln Thr Ala Gly Asp Phe Thr
    1610                1615                1620

Phe Lys Pro Ala Leu Asp Ala Lys Leu Lys Val Thr Asp Lys Thr
    1625                1630                1635

Val Thr Val Thr Tyr Gln Gly Lys Ser Ala Val Ile Asp Ile Thr
    1640                1645                1650

Val Ser Gln Pro Ala Pro Thr Val Ser Lys Thr Asp Leu Asp Lys
    1655                1660                1665

Ala Ile Lys Ala Ile Glu Ala Lys Asn Pro Asp Ser Ser Lys Tyr
    1670                1675                1680

Thr Ala Asp Ser Trp Lys Thr Phe Ala Asp Ala Met Ala His Ala
    1685                1690                1695

Lys Ala Val Ile Ala Asp Ser Ala Thr Gln Gln Asp Val Asp
    1700                1705                1710

Asn Ala Leu Lys Ala Leu Thr Asp Ala Tyr Ala Gly Leu Thr Glu
    1715                1720                1725

Lys Thr Pro Glu Pro Ala Pro Val Ser Lys Ser Glu Leu Asp Lys
    1730                1735                1740

Lys Ile Lys Ala Ile Glu Ala Glu Lys Leu Asp Gly Ser Lys Tyr
    1745                1750                1755

Thr Ala Glu Ser Trp Lys Ala Phe Glu Thr Ala Leu Ala His Ala
    1760                1765                1770

Lys Ala Val Ile Ala Ser Asp Ser Ala Thr Gln Gln Asn Val Asp
    1775                1780                1785

Ala Ala Leu Gly Ala Leu Thr Ser Ala Arg Asp Gly Leu Thr Glu
    1790                1795                1800

Lys Gly Glu Val Lys Pro Asp Pro Lys Pro Glu Pro Gly Thr Val
    1805                1810                1815

Asp Lys Ala Ala Leu Asp Lys Ala Val Lys Lys Val Glu Ala Glu
    1820                1825                1830

Lys Leu Asp Gly Ser Lys Tyr Thr Ala Asp Ser Trp Lys Ala Phe
    1835                1840                1845

Glu Thr Ala Leu Ala His Ala Lys Ala Val Ile Gly Asn Ala Asn
    1850                1855                1860

Ser Thr Gln Phe Asp Ile Asp Asn Ala Leu Ser Met Leu Asn Asp
    1865                1870                1875

Ala Arg Ala Ala Leu Lys Glu Lys Pro Gly Arg Ile Ile Ala Ile
    1880                1885                1890

Ile Asp Gly Ser Ala Leu Ser Lys Thr Gly Ala Ser Val Ala Ile
    1895                1900                1905

Ile Ala Ser Val Ala Ala Ala Met Leu Ala Val Gly Ala Gly Val
    1910                1915                1920

Met Ala Leu Arg Arg Lys Arg Ser
    1925                1930

<210> SEQ ID NO 2
<211> LENGTH: 1341
<212> TYPE: PRT
<213> ORGANISM: Bifidobacterium bifidum

<400> SEQUENCE: 2

Met Lys Lys Pro Leu Gly Lys Ile Val Ala Ser Thr Ala Leu Leu Ile
1               5                   10                  15
```

-continued

```
Ser Val Ala Phe Ser Ser Ile Ala Ser Ala Ile Glu Asp Ala Thr
         20              25              30

Arg Ser Asp Ser Thr Thr Gln Met Ser Ser Thr Pro Glu Val Ala Tyr
         35              40              45

Ser Ser Ala Val Asp Ser Lys Gln Asn Arg Thr Ser Asp Phe Asp Ala
 50              55              60

Asn Trp Lys Phe Met Leu Ser Asp Ser Val Gln Ala Gln Asp Pro Ala
 65              70              75              80

Phe Asp Asp Ser Ala Trp Gln Gln Val Asp Leu Pro His Asp Tyr Ser
                 85              90              95

Ile Thr Gln Lys Tyr Ser Gln Ser Asn Glu Ala Glu Ser Ala Tyr Leu
             100             105             110

Pro Gly Gly Thr Gly Trp Tyr Arg Lys Ser Phe Thr Ile Asp Arg Asp
             115             120             125

Leu Ala Gly Lys Arg Ile Ala Ile Asn Phe Asp Gly Val Tyr Met Asn
 130             135             140

Ala Thr Val Trp Phe Asn Gly Val Lys Leu Gly Thr His Pro Tyr Gly
145             150             155             160

Tyr Ser Pro Phe Ser Phe Asp Leu Thr Gly Asn Ala Lys Phe Gly Gly
                 165             170             175

Glu Asn Thr Ile Val Val Lys Val Glu Asn Arg Leu Pro Ser Ser Arg
             180             185             190

Trp Tyr Ser Gly Ser Gly Ile Tyr Arg Asp Val Thr Leu Thr Val Thr
             195             200             205

Asp Gly Val His Val Gly Asn Asn Gly Val Ala Ile Lys Thr Pro Ser
 210             215             220

Leu Ala Thr Gln Asn Gly Gly Asp Val Thr Met Asn Leu Thr Thr Lys
225             230             235             240

Val Ala Asn Asp Thr Glu Ala Ala Asn Ile Thr Leu Lys Gln Thr
                 245             250             255

Val Phe Pro Lys Gly Gly Lys Thr Asp Ala Ala Ile Gly Thr Val Thr
             260             265             270

Thr Ala Ser Lys Ser Ile Ala Ala Gly Ala Ser Ala Asp Val Thr Ser
             275             280             285

Thr Ile Thr Ala Ala Ser Pro Lys Leu Trp Ser Ile Lys Asn Pro Asn
 290             295             300

Leu Tyr Thr Val Arg Thr Glu Val Leu Asn Gly Gly Lys Val Leu Asp
305             310             315             320

Thr Tyr Asp Thr Glu Tyr Gly Phe Arg Trp Thr Gly Phe Asp Ala Thr
                 325             330             335

Ser Gly Phe Ser Leu Asn Gly Glu Lys Val Lys Leu Lys Gly Val Ser
             340             345             350

Met His His Asp Gln Gly Ser Leu Gly Ala Val Ala Asn Arg Arg Ala
             355             360             365

Ile Glu Arg Gln Val Glu Ile Leu Gln Lys Met Gly Val Asn Ser Ile
 370             375             380

Arg Thr Thr His Asn Pro Ala Ala Lys Ala Leu Ile Asp Val Cys Asn
385             390             395             400

Glu Lys Gly Val Leu Val Val Glu Glu Val Phe Asp Met Trp Asn Arg
                 405             410             415

Ser Lys Asn Gly Asn Thr Glu Asp Tyr Gly Lys Trp Phe Gly Gln Ala
             420             425             430
```

-continued

Ile Ala Gly Asp Asn Ala Val Leu Gly Gly Asp Lys Asp Glu Thr Trp
                435                 440                 445

Ala Lys Phe Asp Leu Thr Ser Thr Ile Asn Arg Asp Arg Asn Ala Pro
450                 455                 460

Ser Val Ile Met Trp Ser Leu Gly Asn Glu Met Met Glu Gly Ile Ser
465                 470                 475                 480

Gly Ser Val Ser Gly Phe Ser Ala Thr Ser Ala Lys Leu Val Ala Trp
                485                 490                 495

Thr Lys Ala Ala Asp Ser Thr Arg Pro Met Thr Tyr Gly Asp Asn Lys
                500                 505                 510

Ile Lys Ala Asn Trp Asn Glu Ser Asn Thr Met Gly Asp Asn Leu Thr
                515                 520                 525

Ala Asn Gly Gly Val Val Gly Thr Asn Tyr Ser Asp Gly Ala Asn Tyr
                530                 535                 540

Asp Lys Ile Arg Thr Thr His Pro Ser Trp Ala Ile Tyr Gly Ser Glu
545                 550                 555                 560

Thr Ala Ser Ala Ile Asn Ser Arg Gly Ile Tyr Asn Arg Thr Thr Gly
                565                 570                 575

Gly Ala Gln Ser Ser Asp Lys Gln Leu Thr Ser Tyr Asp Asn Ser Ala
                580                 585                 590

Val Gly Trp Gly Ala Val Ala Ser Ser Ala Trp Tyr Asp Val Val Gln
                595                 600                 605

Arg Asp Phe Val Ala Gly Thr Tyr Val Trp Thr Gly Phe Asp Tyr Leu
                610                 615                 620

Gly Glu Pro Thr Pro Trp Asn Gly Thr Gly Ser Gly Ala Val Gly Ser
625                 630                 635                 640

Trp Pro Ser Pro Lys Asn Ser Tyr Phe Gly Ile Val Asp Thr Ala Gly
                645                 650                 655

Phe Pro Lys Asp Thr Tyr Tyr Phe Tyr Gln Ser Gln Trp Asn Asp Asp
                660                 665                 670

Val His Thr Leu His Ile Leu Pro Ala Trp Asn Glu Asn Val Val Ala
                675                 680                 685

Lys Gly Ser Gly Asn Asn Val Pro Val Val Val Tyr Thr Asp Ala Ala
690                 695                 700

Lys Val Lys Leu Tyr Phe Thr Pro Lys Gly Ser Thr Glu Gln Arg Leu
705                 710                 715                 720

Ile Gly Glu Lys Ser Phe Thr Lys Lys Thr Ala Ala Gly Tyr Thr
                725                 730                 735

Tyr Gln Val Tyr Glu Gly Ser Asp Lys Asp Ser Thr Ala His Lys Asn
                740                 745                 750

Met Tyr Leu Thr Trp Asn Val Pro Trp Ala Glu Gly Thr Ile Ser Ala
                755                 760                 765

Glu Ala Tyr Asp Glu Asn Asn Arg Leu Ile Pro Glu Gly Ser Thr Glu
                770                 775                 780

Gly Asn Ala Ser Val Thr Thr Gly Lys Ala Ala Lys Leu Lys Ala
785                 790                 795                 800

Asp Ala Asp Arg Lys Thr Ile Thr Ala Asp Gly Lys Asp Leu Ser Tyr
                805                 810                 815

Ile Glu Val Asp Val Thr Asp Ala Asn Gly His Ile Val Pro Asp Ala
                820                 825                 830

Ala Asn Arg Val Thr Phe Asp Val Lys Gly Ala Gly Lys Leu Val Gly
                835                 840                 845

Val Asp Asn Gly Ser Ser Pro Asp His Asp Ser Tyr Gln Ala Asp Asn

```
                850            855            860
    Arg Lys Ala Phe Ser Gly Lys Val Leu Ala Ile Val Gln Ser Thr Lys
    865                 870                 875                 880

Glu Ala Gly Glu Ile Thr Val Thr Ala Lys Ala Asp Gly Leu Gln Ser
                        885                 890                 895

Ser Thr Val Lys Ile Ala Thr Thr Ala Val Pro Gly Thr Ser Thr Glu
                    900                 905                 910

Lys Thr Val Arg Ser Phe Tyr Tyr Ser Arg Asn Tyr Tyr Val Lys Thr
                915                 920                 925

Gly Asn Lys Pro Ile Leu Pro Ser Asp Val Glu Val Arg Tyr Ser Asp
            930                 935                 940

Gly Thr Ser Asp Arg Gln Asn Val Thr Trp Asp Ala Val Ser Asp Asp
    945                 950                 955                 960

Gln Ile Ala Lys Ala Gly Ser Phe Ser Val Ala Gly Thr Val Ala Gly
                        965                 970                 975

Gln Lys Ile Ser Val Arg Val Thr Met Ile Asp Glu Ile Gly Ala Leu
                    980                 985                 990

Leu Asn Tyr Ser Ala Ser Thr Pro  Val Gly Thr Pro Ala  Val Leu Pro
                995                 1000                1005

Gly Ser  Arg Pro Ala Val Leu  Pro Asp Gly Thr Val   Thr Ser Ala
        1010                1015                1020

Asn Phe  Ala Val His Trp Thr   Lys Pro Ala Asp Thr  Val Tyr Asn
        1025                1030                1035

Thr Ala  Gly Thr Val Lys Val  Pro Gly Thr Ala Thr   Val Phe Gly
        1040                1045                1050

Lys Glu  Phe Lys Val Thr Ala   Thr Ile Arg Val Gln  Arg Ser Gln
        1055                1060                1065

Val Thr  Ile Gly Ser Ser Val   Ser Gly Asn Ala Leu  Arg Leu Thr
        1070                1075                1080

Gln Asn  Ile Pro Ala Asp Lys   Gln Ser Asp Thr Leu  Asp Ala Ile
        1085                1090                1095

Lys Asp  Gly Ser Thr Thr Val  Asp Ala Asn Thr Gly   Gly Gly Ala
        1100                1105                1110

Asn Pro  Ser Ala Trp Thr Asn   Trp Ala Tyr Ser Lys  Ala Gly His
        1115                1120                1125

Asn Thr  Ala Glu Ile Thr Phe   Glu Tyr Ala Thr Glu  Gln Gln Leu
        1130                1135                1140

Gly Gln  Ile Val Met Tyr Phe   Phe Arg Asp Ser Asn  Ala Val Arg
        1145                1150                1155

Phe Pro  Asp Ala Gly Lys Thr   Lys Ile Gln Ile Ser  Ala Asp Gly
        1160                1165                1170

Lys Asn  Trp Thr Asp Leu Ala   Ala Thr Glu Thr Ile  Ala Ala Gln
        1175                1180                1185

Glu Ser  Ser Asp Arg Val Lys  Pro Tyr Thr Tyr Asp   Phe Ala Pro
        1190                1195                1200

Val Gly  Ala Thr Phe Val Arg   Val Thr Val Thr Asn  Ala Asp Thr
        1205                1210                1215

Thr Thr  Pro Ser Gly Val Val   Cys Ala Gly Leu Thr  Glu Ile Glu
        1220                1225                1230

Leu Lys  Thr Ala Thr Ser Lys   Phe Val Ala Asn Thr  Ser Ala Ala
        1235                1240                1245

Leu Ser  Ser Leu Thr Val Asn   Gly Thr Lys Val Ser  Asp Ser Val
        1250                1255                1260
```

```
Leu Ala Ala Gly Ser Tyr Asn Thr Pro Ala Ile Ile Ala Asp Val
    1265                1270                1275

Lys Ala Glu Gly Glu Gly Asn Ala Ser Val Thr Val Leu Pro Ala
    1280                1285                1290

His Asp Asn Val Ile Arg Val Ile Thr Glu Ser Glu Asp His Val
    1295                1300                1305

Thr Arg Lys Thr Phe Thr Ile Asn Leu Gly Thr Glu Gln Glu Phe
    1310                1315                1320

Pro Ala Asp Ser Asp Glu Arg Asp Gln His Gln His Gln His Gln
    1325                1330                1335

His Gln Gln
    1340

<210> SEQ ID NO 3
<211> LENGTH: 1752
<212> TYPE: PRT
<213> ORGANISM: Bifidobacterium bifidum

<400> SEQUENCE: 3

Met Ala Val Arg Arg Leu Gly Gly Arg Ile Val Ala Phe Ala Ala Thr
1               5                   10                  15

Val Ala Leu Ser Ile Pro Leu Gly Leu Leu Thr Asn Ser Ala Trp Ala
                20                  25                  30

Val Glu Asp Ala Thr Arg Ser Asp Ser Thr Thr Gln Met Ser Ser Thr
            35                  40                  45

Pro Glu Val Val Tyr Ser Ser Ala Val Asp Ser Lys Gln Asn Arg Thr
    50                  55                  60

Ser Asp Phe Asp Ala Asn Trp Lys Phe Met Leu Ser Asp Ser Val Gln
65              70                  75                  80

Ala Gln Asp Pro Ala Phe Asp Ser Ala Trp Gln Val Asp Leu
                85                  90                  95

Pro His Asp Tyr Ser Ile Thr Gln Lys Tyr Ser Gln Ser Asn Glu Ala
                100                 105                 110

Glu Ser Ala Tyr Leu Pro Gly Gly Thr Gly Trp Tyr Arg Lys Ser Phe
            115                 120                 125

Thr Ile Asp Arg Asp Leu Ala Gly Lys Arg Ile Ala Ile Asn Phe Asp
    130                 135                 140

Gly Val Tyr Met Asn Ala Thr Val Trp Phe Asn Gly Val Lys Leu Gly
145                 150                 155                 160

Thr His Pro Tyr Gly Tyr Ser Pro Phe Ser Phe Asp Leu Thr Gly Asn
                165                 170                 175

Ala Lys Phe Gly Gly Glu Asn Thr Ile Val Val Lys Val Glu Asn Arg
            180                 185                 190

Leu Pro Ser Ser Arg Trp Tyr Ser Gly Ser Gly Ile Tyr Arg Asp Val
    195                 200                 205

Thr Leu Thr Val Thr Asp Gly Val His Val Gly Asn Asn Gly Val Ala
    210                 215                 220

Ile Lys Thr Pro Ser Leu Ala Thr Gln Asn Gly Gly Asp Val Thr Met
225                 230                 235                 240

Asn Leu Thr Thr Lys Val Ala Asn Asp Thr Glu Ala Ala Ala Asn Ile
                245                 250                 255

Thr Leu Lys Gln Thr Val Phe Pro Lys Gly Gly Lys Thr Asp Ala Ala
            260                 265                 270

Ile Gly Thr Val Thr Thr Ala Ser Lys Ser Ile Ala Ala Gly Ala Ser
```

-continued

```
                275                 280                 285
Ala Asp Val Thr Ser Thr Ile Thr Ala Ala Ser Pro Lys Leu Trp Ser
290                 295                 300
Ile Lys Asn Pro Asn Leu Tyr Thr Val Arg Thr Glu Val Leu Asn Gly
305                 310                 315                 320
Gly Lys Val Leu Asp Thr Tyr Asp Thr Glu Tyr Gly Phe Arg Trp Thr
                325                 330                 335
Gly Phe Asp Ala Thr Ser Gly Phe Ser Leu Asn Gly Glu Lys Val Lys
                340                 345                 350
Leu Lys Gly Val Ser Met His His Asp Gln Gly Ser Leu Gly Ala Val
                355                 360                 365
Ala Asn Arg Arg Ala Ile Glu Arg Gln Val Glu Ile Leu Gln Lys Met
370                 375                 380
Gly Val Asn Ser Ile Arg Thr Thr His Asn Pro Ala Ala Lys Ala Leu
385                 390                 395                 400
Ile Asp Val Cys Asn Glu Lys Gly Val Leu Val Val Glu Glu Val Phe
                405                 410                 415
Asp Met Trp Asn Arg Ser Lys Asn Gly Asn Thr Glu Asp Tyr Gly Lys
                420                 425                 430
Trp Phe Gly Gln Ala Ile Ala Gly Asp Asn Ala Val Leu Gly Gly Asp
                435                 440                 445
Lys Asp Glu Thr Trp Ala Lys Phe Asp Leu Thr Ser Thr Ile Asn Arg
450                 455                 460
Asp Arg Asn Ala Pro Ser Val Ile Met Trp Ser Leu Gly Asn Glu Met
465                 470                 475                 480
Met Glu Gly Ile Ser Gly Ser Val Ser Gly Phe Pro Ala Thr Ser Ala
                485                 490                 495
Lys Leu Val Ala Trp Thr Lys Ala Ala Asp Ser Thr Arg Pro Met Thr
                500                 505                 510
Tyr Gly Asp Asn Lys Ile Lys Ala Asn Trp Asn Glu Ser Asn Thr Met
                515                 520                 525
Gly Asp Asn Leu Thr Ala Asn Gly Gly Val Val Gly Thr Asn Tyr Ser
530                 535                 540
Asp Gly Ala Asn Tyr Asp Lys Ile Arg Thr Thr His Pro Ser Trp Ala
545                 550                 555                 560
Ile Tyr Gly Ser Glu Thr Ala Ser Ala Ile Asn Ser Arg Gly Ile Tyr
                565                 570                 575
Asn Arg Thr Thr Gly Gly Ala Gln Ser Ser Asp Lys Gln Leu Thr Ser
                580                 585                 590
Tyr Asp Asn Ser Ala Val Gly Trp Gly Ala Val Ala Ser Ser Ala Trp
                595                 600                 605
Tyr Asp Val Val Gln Arg Asp Phe Val Ala Gly Thr Tyr Val Trp Thr
                610                 615                 620
Gly Phe Asp Tyr Leu Gly Glu Pro Thr Pro Trp Asn Gly Thr Gly Ser
625                 630                 635                 640
Gly Ala Val Gly Ser Trp Pro Ser Pro Lys Asn Ser Tyr Phe Gly Ile
                645                 650                 655
Val Asp Thr Ala Gly Phe Pro Lys Asp Thr Tyr Tyr Phe Tyr Gln Ser
                660                 665                 670
Gln Trp Asn Asp Asp Val His Thr Leu His Ile Leu Pro Ala Trp Asn
                675                 680                 685
Glu Asn Val Val Ala Lys Gly Ser Gly Asn Asn Val Pro Val Val Val
690                 695                 700
```

-continued

```
Tyr Thr Asp Ala Ala Lys Val Lys Leu Tyr Phe Thr Pro Lys Gly Ser
705                 710                 715                 720

Thr Glu Lys Arg Leu Ile Gly Glu Lys Ser Phe Thr Lys Lys Thr Thr
                725                 730                 735

Ala Ala Gly Tyr Thr Tyr Gln Val Tyr Glu Gly Ser Asp Lys Asp Ser
            740                 745                 750

Thr Ala His Lys Asn Met Tyr Leu Thr Trp Asn Val Pro Trp Ala Glu
        755                 760                 765

Gly Thr Ile Ser Ala Glu Ala Tyr Asp Glu Asn Asn Arg Leu Ile Pro
    770                 775                 780

Glu Gly Ser Thr Glu Gly Asn Ala Ser Val Thr Thr Gly Lys Ala
785                 790                 795                 800

Ala Lys Leu Lys Ala Asp Ala Asp Arg Lys Thr Ile Thr Ala Asp Gly
                805                 810                 815

Lys Asp Leu Ser Tyr Ile Glu Val Asp Val Thr Asp Ala Asn Gly His
            820                 825                 830

Ile Val Pro Asp Ala Ala Asn Arg Val Thr Phe Asp Val Lys Gly Ala
        835                 840                 845

Gly Lys Leu Val Gly Val Asp Asn Gly Ser Ser Pro Asp His Asp Ser
    850                 855                 860

Tyr Gln Ala Asp Asn Arg Lys Ala Phe Ser Gly Lys Val Leu Ala Ile
865                 870                 875                 880

Val Gln Ser Thr Lys Glu Ala Gly Glu Ile Thr Val Thr Ala Lys Ala
                885                 890                 895

Asp Gly Leu Gln Ser Ser Thr Val Lys Ile Ala Thr Thr Ala Val Pro
            900                 905                 910

Gly Thr Ser Thr Glu Lys Thr Val Arg Ser Phe Tyr Tyr Ser Arg Asn
        915                 920                 925

Tyr Tyr Val Lys Thr Gly Asn Lys Pro Ile Leu Pro Ser Asp Val Glu
    930                 935                 940

Val Arg Tyr Ser Asp Gly Thr Ser Asp Arg Gln Asn Val Thr Trp Asp
945                 950                 955                 960

Ala Val Ser Asp Asp Gln Ile Ala Lys Ala Gly Ser Phe Ser Val Ala
                965                 970                 975

Gly Thr Val Ala Gly Gln Lys Ile Ser Val Arg Val Thr Met Ile Asp
            980                 985                 990

Glu Ile Gly Ala Leu Leu Asn Tyr Ser Ala Ser Thr Pro Val Gly Thr
        995                 1000                1005

Pro Ala Val Leu Pro Gly Ser Arg Pro Ala Val Leu Pro Asp Gly
    1010                1015                1020

Thr Val Thr Ser Ala Asn Phe Ala Val His Trp Thr Lys Pro Ala
    1025                1030                1035

Asp Thr Val Tyr Asn Thr Ala Gly Thr Val Lys Val Pro Gly Thr
    1040                1045                1050

Ala Thr Val Phe Gly Lys Glu Phe Lys Val Thr Ala Thr Ile Arg
    1055                1060                1065

Val Gln Arg Ser Gln Val Thr Ile Gly Ser Ser Val Ser Gly Asn
    1070                1075                1080

Ala Leu Arg Leu Thr Gln Asn Ile Pro Ala Asp Lys Gln Ser Asp
    1085                1090                1095

Thr Leu Asp Ala Ile Lys Asp Gly Ser Thr Val Asp Ala Asn
    1100                1105                1110
```

```
Thr Gly Gly Gly Ala Asn Pro Ser Ala Trp Thr Asn Trp Ala Tyr
1115                1120                1125

Ser Lys Ala Gly His Asn Thr Ala Glu Ile Thr Phe Glu Tyr Ala
1130                1135                1140

Thr Glu Gln Gln Leu Gly Gln Ile Val Met Tyr Phe Phe Arg Asp
1145                1150                1155

Ser Asn Ala Val Arg Phe Pro Asp Ala Gly Lys Thr Lys Ile Gln
1160                1165                1170

Ile Ser Ala Asp Gly Lys Asn Trp Thr Asp Leu Ala Ala Thr Glu
1175                1180                1185

Thr Ile Ala Ala Gln Glu Ser Ser Asp Arg Val Lys Pro Tyr Thr
1190                1195                1200

Tyr Asp Phe Ala Pro Val Gly Ala Thr Phe Val Lys Val Thr Val
1205                1210                1215

Thr Asn Ala Asp Thr Thr Thr Pro Ser Gly Val Val Cys Ala Gly
1220                1225                1230

Leu Thr Glu Ile Glu Leu Lys Thr Ala Thr Ser Lys Phe Val Thr
1235                1240                1245

Asn Thr Ser Ala Ala Leu Ser Ser Leu Thr Val Asn Gly Thr Lys
1250                1255                1260

Val Ser Asp Ser Val Leu Ala Ala Gly Ser Tyr Asn Thr Pro Ala
1265                1270                1275

Ile Ile Ala Asp Val Lys Ala Glu Gly Glu Gly Asn Ala Ser Val
1280                1285                1290

Thr Val Leu Pro Ala His Asp Asn Val Ile Arg Val Ile Thr Glu
1295                1300                1305

Ser Glu Asp His Val Thr Arg Lys Thr Phe Thr Ile Asn Leu Gly
1310                1315                1320

Thr Glu Gln Glu Phe Pro Ala Asp Ser Asp Glu Arg Asp Tyr Pro
1325                1330                1335

Ala Ala Asp Met Thr Val Thr Val Gly Ser Glu Gln Thr Ser Gly
1340                1345                1350

Thr Ala Thr Glu Gly Pro Lys Lys Phe Ala Val Asp Gly Asn Thr
1355                1360                1365

Ser Thr Tyr Trp His Ser Asn Trp Thr Pro Thr Thr Val Asn Asp
1370                1375                1380

Leu Trp Ile Ala Phe Glu Leu Gln Lys Pro Thr Lys Leu Asp Ala
1385                1390                1395

Leu Arg Tyr Leu Pro Arg Pro Ala Gly Ser Lys Asn Gly Ser Val
1400                1405                1410

Thr Glu Tyr Lys Val Gln Val Ser Asp Asp Gly Thr Asn Trp Thr
1415                1420                1425

Asp Ala Gly Ser Gly Thr Trp Thr Thr Asp Tyr Gly Trp Lys Leu
1430                1435                1440

Ala Glu Phe Asn Gln Pro Val Thr Thr Lys His Val Arg Leu Lys
1445                1450                1455

Ala Val His Thr Tyr Ala Asp Ser Gly Asn Asp Lys Phe Met Ser
1460                1465                1470

Ala Ser Glu Ile Arg Leu Arg Lys Ala Val Asp Thr Thr Asp Ile
1475                1480                1485

Ser Gly Ala Thr Val Thr Val Pro Ala Lys Leu Thr Val Asp Arg
1490                1495                1500

Val Asp Ala Asp His Pro Ala Thr Phe Ala Thr Lys Asp Val Thr
```

```
              1505                1510                1515

Val Thr Leu Gly Asp Ala Thr Leu Arg Tyr Gly Val Asp Tyr Leu
        1520                1525                1530

Leu Asp Tyr Ala Gly Asn Thr Ala Val Gly Lys Ala Thr Val Thr
    1535                1540                1545

Val Arg Gly Ile Asp Lys Tyr Ser Gly Thr Val Ala Lys Thr Phe
1550                1555                1560

Thr Ile Glu Leu Lys Asn Ala Pro Ala Pro Glu Pro Thr Leu Thr
    1565                1570                1575

Ser Val Ser Val Lys Thr Lys Pro Ser Lys Leu Thr Tyr Val Val
        1580                1585                1590

Gly Asp Ala Phe Asp Pro Ala Gly Leu Val Leu Gln His Asp Arg
        1595                1600                1605

Gln Ala Asp Arg Pro Pro Gln Pro Leu Val Gly Glu Gln Ala Asp
        1610                1615                1620

Glu Arg Gly Leu Thr Cys Gly Thr Arg Cys Asp Arg Val Glu Gln
        1625                1630                1635

Leu Arg Lys His Glu Asn Arg Glu Ala His Arg Thr Gly Leu Asp
        1640                1645                1650

His Leu Glu Phe Val Gly Ala Ala Asp Gly Ala Val Gly Glu Gln
        1655                1660                1665

Ala Thr Phe Lys Val His Val His Ala Asp Gln Gly Asp Gly Arg
        1670                1675                1680

His Asp Asp Ala Asp Glu Arg Asp Ile Asp Pro His Val Pro Val
    1685                1690                1695

Asp His Ala Val Gly Glu Leu Ala Arg Ala Ala Cys His His Val
    1700                1705                1710

Ile Gly Leu Arg Val Asp Thr His Arg Leu Lys Ala Ser Gly Phe
        1715                1720                1725

Gln Ile Pro Ala Asp Asp Met Ala Glu Ile Asp Arg Ile Thr Gly
        1730                1735                1740

Phe His Arg Phe Glu Arg His Val Gly
        1745                1750

<210> SEQ ID NO 4
<211> LENGTH: 1935
<212> TYPE: PRT
<213> ORGANISM: Bifidobacterium bifidum

<400> SEQUENCE: 4

Met Ala Val Arg Arg Leu Gly Gly Arg Ile Val Ala Phe Ala Ala Thr
1               5                   10                  15

Val Ala Leu Ser Ile Pro Leu Gly Leu Leu Thr Asn Ser Ala Trp Ala
            20                  25                  30

Val Glu Asp Ala Thr Arg Ser Asp Ser Thr Thr Gln Met Ser Ser Thr
        35                  40                  45

Pro Glu Val Val Tyr Ser Ser Ala Val Asp Ser Lys Gln Asn Arg Thr
    50                  55                  60

Ser Asp Phe Asp Ala Asn Trp Lys Phe Met Leu Ser Asp Ser Val Gln
65                  70                  75                  80

Ala Gln Asp Pro Ala Phe Asp Asp Ser Ala Trp Gln Val Asp Leu
                85                  90                  95

Pro His Asp Tyr Ser Ile Thr Gln Lys Tyr Ser Gln Ser Asn Glu Ala
            100                 105                 110
```

```
Glu Ser Ala Tyr Leu Pro Gly Thr Gly Trp Tyr Arg Lys Ser Phe
            115                 120                 125
Thr Ile Asp Arg Asp Leu Ala Gly Lys Arg Ile Ala Ile Asn Phe Asp
    130                 135                 140
Gly Val Tyr Met Asn Ala Thr Val Trp Phe Asn Gly Val Lys Leu Gly
145                 150                 155                 160
Thr His Pro Tyr Gly Tyr Ser Pro Phe Ser Phe Asp Leu Thr Gly Asn
                165                 170                 175
Ala Lys Phe Gly Gly Glu Asn Thr Ile Val Val Lys Val Glu Asn Arg
            180                 185                 190
Leu Pro Ser Ser Arg Trp Tyr Ser Gly Ser Ile Tyr Arg Asp Val
    195                 200                 205
Thr Leu Thr Val Thr Asp Gly Val His Val Gly Asn Asn Gly Val Ala
210                 215                 220
Ile Lys Thr Pro Ser Leu Ala Thr Gln Asn Gly Gly Asn Val Thr Met
225                 230                 235                 240
Asn Leu Thr Thr Lys Val Ala Asn Asp Thr Lys Ala Ala Ala Asn Ile
            245                 250                 255
Thr Leu Lys Gln Thr Val Phe Pro Lys Gly Lys Thr Asp Ala Ala
    260                 265                 270
Ile Gly Thr Val Thr Thr Ala Ser Lys Ser Ile Ala Ala Gly Ala Ser
            275                 280                 285
Ala Asp Val Thr Ser Thr Ile Thr Ala Ala Ser Pro Lys Leu Trp Ser
    290                 295                 300
Ile Lys Asn Pro Asn Leu Tyr Thr Val Arg Thr Glu Val Leu Asn Gly
305                 310                 315                 320
Gly Lys Val Leu Asp Thr Tyr Asp Thr Glu Tyr Gly Phe Arg Trp Thr
                325                 330                 335
Gly Phe Asp Ala Thr Ser Gly Phe Ser Leu Asn Gly Glu Lys Val Lys
            340                 345                 350
Leu Lys Gly Val Ser Met His His Asp Gln Gly Ser Leu Gly Ala Val
    355                 360                 365
Ala Asn Arg Arg Ala Ile Glu Arg Gln Val Glu Ile Leu Gln Lys Met
370                 375                 380
Gly Val Asn Ser Ile Arg Thr Thr His Asn Pro Ala Ala Lys Ala Leu
385                 390                 395                 400
Ile Asp Val Cys Asn Glu Lys Gly Val Leu Val Glu Glu Val Phe
                405                 410                 415
Asp Met Trp Asn Arg Ser Lys Asn Gly Asn Thr Glu Asp Tyr Gly Lys
            420                 425                 430
Trp Phe Gly Gln Ala Ile Ala Gly Asp Asn Ala Val Leu Gly Gly Asp
    435                 440                 445
Lys Asp Glu Thr Trp Ala Lys Phe Asp Leu Thr Ser Thr Ile Asn Arg
450                 455                 460
Asp Arg Asn Ala Pro Ser Val Ile Met Trp Ser Leu Gly Asn Glu Met
465                 470                 475                 480
Met Glu Gly Ile Ser Gly Ser Val Ser Gly Phe Pro Ala Thr Ser Ala
                485                 490                 495
Lys Leu Val Ala Trp Thr Lys Ala Ala Asp Ser Thr Arg Pro Met Thr
            500                 505                 510
Tyr Gly Asp Asn Lys Ile Lys Ala Asn Trp Asn Glu Ser Asn Thr Met
    515                 520                 525
Gly Asp Asn Leu Thr Ala Asn Gly Gly Val Val Gly Thr Asn Tyr Ser
```

```
            530                 535                 540
Asp Gly Ala Asn Tyr Asp Lys Ile Arg Thr Thr His Pro Ser Trp Ala
545                 550                 555                 560

Ile Tyr Gly Ser Glu Thr Ala Ser Ala Ile Asn Ser Arg Gly Ile Tyr
                565                 570                 575

Asn Arg Thr Thr Gly Gly Ala Gln Ser Ser Asp Lys Gln Leu Thr Ser
            580                 585                 590

Tyr Asp Asn Ser Ala Val Gly Trp Gly Ala Val Ala Ser Ser Ala Trp
                595                 600                 605

Tyr Asp Val Val Gln Arg Asp Phe Val Ala Gly Thr Tyr Val Trp Thr
            610                 615                 620

Gly Phe Asp Tyr Leu Gly Glu Pro Thr Pro Trp Asn Gly Thr Gly Ser
625                 630                 635                 640

Gly Ala Val Gly Ser Trp Pro Ser Pro Lys Asn Ser Tyr Phe Gly Ile
                645                 650                 655

Val Asp Thr Ala Gly Phe Pro Lys Asp Thr Tyr Tyr Phe Tyr Gln Ser
            660                 665                 670

Gln Trp Asn Asp Asp Val His Thr Leu His Ile Leu Pro Ala Trp Asn
                675                 680                 685

Glu Asn Val Val Ala Lys Gly Ser Gly Asn Asn Val Pro Val Val Val
            690                 695                 700

Tyr Thr Asp Ala Ala Lys Val Lys Leu Tyr Phe Thr Pro Lys Gly Ser
705                 710                 715                 720

Thr Glu Lys Arg Leu Ile Gly Glu Lys Ser Phe Thr Lys Lys Thr Thr
                725                 730                 735

Ala Ala Gly Tyr Thr Tyr Gln Val Tyr Glu Gly Ala Asp Lys Asp Ser
            740                 745                 750

Thr Ala His Lys Asn Met Tyr Leu Thr Trp Asn Val Pro Trp Ala Glu
                755                 760                 765

Gly Thr Ile Ser Ala Glu Ala Tyr Asp Glu Asn Asn Arg Leu Ile Pro
770                 775                 780

Glu Gly Ser Thr Glu Gly Asn Ala Ser Val Thr Thr Gly Lys Ala
785                 790                 795                 800

Ala Lys Leu Lys Ala Asp Ala Asp Arg Lys Thr Ile Thr Ala Asp Gly
                805                 810                 815

Lys Asp Leu Ser Tyr Ile Glu Val Asp Val Thr Asp Ala Asn Gly His
            820                 825                 830

Ile Val Pro Asp Ala Ala Asn Arg Val Thr Phe Asp Val Lys Gly Ala
                835                 840                 845

Gly Lys Leu Val Gly Val Asp Asn Gly Ser Ser Pro Asp His Asp Ser
850                 855                 860

Tyr Gln Ala Asp Asn Arg Lys Ala Phe Ser Gly Lys Val Leu Ala Ile
865                 870                 875                 880

Val Gln Ser Thr Lys Glu Ala Gly Glu Ile Thr Val Thr Ala Lys Ala
                885                 890                 895

Asp Gly Leu Gln Ser Ser Thr Val Lys Ile Ala Thr Thr Ala Val Pro
            900                 905                 910

Gly Thr Ser Thr Glu Lys Thr Val Arg Ser Phe Tyr Tyr Ser Arg Asn
                915                 920                 925

Tyr Tyr Val Lys Thr Gly Asn Lys Pro Ile Leu Pro Ser Asp Val Glu
            930                 935                 940

Val Arg Tyr Ser Asp Gly Thr Ser Asp Arg Gln Asn Val Thr Trp Asp
945                 950                 955                 960
```

-continued

```
Ala Val Ser Asp Asp Gln Ile Ala Lys Ala Gly Ser Phe Ser Val Ala
            965                 970                 975
Gly Thr Val Ala Gly Gln Lys Ile Ser Val Arg Val Thr Met Ile Asp
            980                 985                 990
Glu Ile Gly Ala Leu Leu Asn Tyr Ser Ala Ser Thr Pro Val Gly Thr
            995                1000                1005
Pro Ala Val Leu Pro Gly Ser Arg Pro Ala Val Leu Pro Asp Gly
           1010                1015                1020
Thr Val Thr Ser Ala Asn Phe Ala Val Asp Trp Thr Lys Pro Ala
           1025                1030                1035
Asp Thr Val Tyr Asn Thr Ala Gly Thr Val Lys Val Pro Gly Thr
           1040                1045                1050
Ala Thr Val Phe Gly Lys Glu Phe Lys Val Thr Ala Thr Ile Arg
           1055                1060                1065
Val Gln Arg Ser Gln Val Thr Ile Gly Ser Ser Val Ser Gly Asn
           1070                1075                1080
Ala Leu Arg Leu Thr Gln Asn Ile Pro Ala Asp Lys Gln Ser Asp
           1085                1090                1095
Thr Leu Asp Ala Ile Lys Asp Gly Ser Thr Thr Val Asp Ala Asn
           1100                1105                1110
Thr Gly Gly Gly Ala Asn Pro Ser Ala Trp Thr Asn Trp Ala Tyr
           1115                1120                1125
Ser Lys Ala Gly His Asn Thr Ala Glu Ile Thr Phe Glu Tyr Ala
           1130                1135                1140
Thr Glu Gln Gln Leu Gly Gln Ile Val Met Tyr Phe Phe Arg Asp
           1145                1150                1155
Ser Asn Ala Val Arg Phe Pro Asp Ala Gly Lys Thr Lys Ile Gln
           1160                1165                1170
Ile Ser Ala Asp Gly Lys Asn Trp Thr Asp Leu Ala Ala Thr Glu
           1175                1180                1185
Thr Ile Ala Ala Gln Glu Ser Ser Asp Arg Val Lys Pro Tyr Thr
           1190                1195                1200
Tyr Asp Phe Ala Pro Val Gly Ala Thr Phe Val Lys Val Thr Val
           1205                1210                1215
Thr Asn Ala Asp Thr Thr Thr Pro Ser Gly Val Val Cys Ala Gly
           1220                1225                1230
Leu Thr Glu Ile Glu Leu Lys Thr Ala Thr Ser Lys Phe Val Thr
           1235                1240                1245
Asn Thr Ser Ala Ala Leu Ser Ser Leu Thr Val Asn Gly Thr Lys
           1250                1255                1260
Val Ser Asp Ser Val Leu Ala Ala Gly Ser Tyr Asn Thr Pro Ala
           1265                1270                1275
Ile Ile Ala Asp Val Lys Ala Glu Gly Glu Gly Asn Ala Ser Val
           1280                1285                1290
Thr Val Leu Pro Ala His Asp Asn Val Ile Arg Val Ile Thr Glu
           1295                1300                1305
Ser Glu Asp His Val Thr Arg Lys Thr Phe Thr Ile Asn Leu Gly
           1310                1315                1320
Thr Glu Gln Glu Phe Pro Ala Asp Ser Asp Glu Arg Asp Tyr Pro
           1325                1330                1335
Ala Ala Asp Met Thr Val Thr Ala Gly Ser Glu Gln Thr Ser Gly
           1340                1345                1350
```

```
Thr Ala Thr Glu Gly Pro Lys Lys Phe Ala Val Asp Gly Asn Thr
1355                1360                1365

Ser Thr Tyr Trp His Ser Asn Trp Thr Pro Thr Val Asn Asp
1370                1375                1380

Leu Trp Ile Ala Phe Glu Leu Gln Lys Pro Thr Lys Leu Asp Ala
1385                1390                1395

Leu Arg Tyr Leu Pro Arg Pro Ala Gly Ser Lys Asn Gly Ser Val
1400                1405                1410

Thr Glu Tyr Lys Val Gln Val Ser Asp Asp Gly Thr Asn Trp Thr
1415                1420                1425

Asp Ala Gly Ser Gly Thr Trp Thr Thr Asp Tyr Gly Trp Lys Leu
1430                1435                1440

Ala Glu Phe Asn Gln Pro Val Thr Thr Lys His Val Arg Leu Lys
1445                1450                1455

Ala Val His Thr Tyr Ala Asp Ser Gly Asn Asp Lys Phe Met Ser
1460                1465                1470

Ala Ser Glu Ile Arg Leu Arg Lys Ala Val Asp Thr Thr Asp Ile
1475                1480                1485

Ser Gly Ala Thr Val Thr Val Pro Ala Lys Leu Thr Val Asp Arg
1490                1495                1500

Val Asp Ala Asp His Pro Ala Thr Phe Ala Thr Lys Asp Val Thr
1505                1510                1515

Val Thr Leu Gly Asp Ala Thr Leu Arg Tyr Gly Val Asp Tyr Leu
1520                1525                1530

Leu Asp Tyr Ala Gly Asn Thr Ala Val Gly Lys Ala Thr Val Thr
1535                1540                1545

Val Arg Gly Ile Asp Lys Tyr Ser Gly Thr Val Ala Lys Thr Phe
1550                1555                1560

Thr Ile Glu Leu Lys Asn Ala Pro Ala Pro Glu Pro Thr Leu Thr
1565                1570                1575

Ser Val Ser Val Lys Thr Lys Pro Ser Lys Leu Thr Tyr Val Val
1580                1585                1590

Gly Asp Ala Phe Asp Pro Ala Gly Leu Val Leu Gln Leu Asn Tyr
1595                1600                1605

Asp Asp Asp Ser Thr Gly Thr Val Thr Trp Asn Thr Gln Thr Ala
1610                1615                1620

Gly Asp Phe Thr Phe Lys Pro Ala Leu Asp Ala Lys Leu Lys Val
1625                1630                1635

Thr Asp Lys Thr Val Thr Val Thr Tyr Gln Gly Lys Ser Ala Val
1640                1645                1650

Ile Asp Ile Thr Val Ser Gln Pro Ala Pro Thr Val Ser Lys Thr
1655                1660                1665

Asp Leu Asp Lys Ala Ile Lys Ala Ile Glu Ala Lys Asn Pro Asp
1670                1675                1680

Ser Ser Lys Tyr Thr Ala Asp Ser Trp Lys Thr Phe Ala Asp Ala
1685                1690                1695

Met Ala His Ala Lys Ala Val Ile Ala Asp Asp Ser Ala Thr Gln
1700                1705                1710

Gln Asp Val Asp Lys Ala Leu Lys Ala Leu Thr Asp Ala Tyr Ala
1715                1720                1725

Gly Leu Thr Glu Lys Thr Pro Glu Pro Ala Pro Val Ser Lys Ser
1730                1735                1740

Glu Leu Asp Lys Lys Ile Lys Ala Ile Glu Ala Glu Lys Leu Asp
```

-continued

```
            1745                1750                1755
Gly  Ser  Lys  Tyr  Thr  Ala  Glu  Ser  Trp  Lys  Ala  Phe  Glu  Thr  Ala
     1760                1765                1770

Leu  Ala  His  Ala  Lys  Ala  Val  Ile  Ala  Ser  Asp  Ser  Ala  Thr  Gln
     1775                1780                1785

Gln  Asp  Val  Asp  Ala  Ala  Leu  Gly  Ala  Leu  Thr  Ser  Ala  Arg  Asp
     1790                1795                1800

Gly  Leu  Thr  Glu  Lys  Gly  Glu  Val  Lys  Pro  Asp  Pro  Lys  Pro  Glu
     1805                1810                1815

Pro  Gly  Thr  Val  Asp  Lys  Ala  Ala  Leu  Asp  Lys  Ala  Val  Lys  Lys
     1820                1825                1830

Val  Glu  Ala  Glu  Lys  Leu  Asp  Gly  Ser  Lys  Tyr  Thr  Ala  Asp  Ser
     1835                1840                1845

Trp  Lys  Ala  Phe  Glu  Thr  Ala  Leu  Ala  His  Ala  Lys  Ala  Val  Ile
     1850                1855                1860

Gly  Asn  Ala  Asn  Ser  Thr  Gln  Phe  Asp  Ile  Asp  Asn  Ala  Leu  Ser
     1865                1870                1875

Met  Leu  Asn  Asp  Ala  Arg  Ala  Ala  Leu  Lys  Glu  Lys  Pro  Gly  Arg
     1880                1885                1890

Ile  Ile  Ala  Ile  Ile  Asp  Gly  Gly  Ala  Leu  Ser  Lys  Thr  Gly  Ala
     1895                1900                1905

Ser  Val  Ala  Ile  Ile  Ala  Ser  Val  Ala  Ala  Ala  Met  Lys  Ala  Val
     1910                1915                1920

Gly  Ala  Gly  Val  Met  Ala  Leu  Arg  Pro  Pro  Lys  Trp
     1925                1930                1935
```